US011712701B2

(12) United States Patent
Cesena et al.

(10) Patent No.: US 11,712,701 B2
(45) Date of Patent: Aug. 1, 2023

(54) WOOD GRINDING MACHINE WITH VIBRATION DETECTION SYSTEM AND RELATED METHODS

(71) Applicant: Alamo Group Inc., Seguin, TX (US)

(72) Inventors: Douglas Raymond Cesena, Mount Pleasant, MI (US); Lawrence Alan Hazen, Barryton, MI (US); Peter Hoekstra, Walterswald (NL)

(73) Assignee: Alamo Group Inc., Seguin, TX (US)

( * ) Notice: Subject to any disclaimer, the term of this patent is extended or adjusted under 35 U.S.C. 154(b) by 183 days.

(21) Appl. No.: 16/921,704

(22) Filed: Jul. 6, 2020

(65) Prior Publication Data

US 2022/0001390 A1 Jan. 6, 2022

(51) Int. Cl.
| | | |
|---|---|---|
| *B02C 25/00* | (2006.01) | |
| *B02C 18/24* | (2006.01) | |
| *B02C 21/02* | (2006.01) | |
| *B02C 18/16* | (2006.01) | |
| *A01G 3/00* | (2006.01) | |

(52) U.S. Cl.
CPC .............. *B02C 25/00* (2013.01); *B02C 18/24* (2013.01); *B02C 21/026* (2013.01); *B02C 2018/164* (2013.01)

(58) Field of Classification Search
CPC ....... B02C 25/00; B02C 18/24; B02C 18/067; B02C 21/026; B02C 2018/164
See application file for complete search history.

(56) References Cited

U.S. PATENT DOCUMENTS

| | | | |
|---|---|---|---|
| 7,090,157 | B2 | 8/2006 | Peterson et al. |
| 7,232,084 | B2 | 6/2007 | Peterson et al. |
| 7,325,759 | B2 | 2/2008 | Meyer |
| 7,832,670 | B2 | 11/2010 | Peterson et al. |
| 7,900,858 | B2 | 3/2011 | Ragnarsson |
| 10,099,224 | B2 | 10/2018 | Peterson et al. |
| 2005/0001083 | A1* | 1/2005 | Cook .................... B02C 18/067 241/292.1 |
| 2006/0163398 | A1* | 7/2006 | Coble ..................... B02C 18/24 241/101.761 |
| 2006/0266855 | A1* | 11/2006 | Meyer ..................... B02C 25/00 241/30 |
| 2009/0224087 | A1* | 9/2009 | Ragnarsson ............ B02C 13/06 241/34 |
| 2019/0001340 | A1* | 1/2019 | Lutoslawski .......... B02C 25/00 |
| 2021/0268513 | A1* | 9/2021 | Simon .................... A01G 3/002 |

OTHER PUBLICATIONS

Relation Between Amplitude and Frequency, retrieved date Jul. 26, 2022.*
Vermeer Manufacturing Company, "Damage Defense for Tub and Horizontal Grinders", 1 page, Apr. 2017.
DDS (Damage Decreasing System) by OBMtec, 3 pages, Nov. 6, 2012.
Homec, Machine Engineering en Consultancy, 5 pages, Nov. 2017.

* cited by examiner

*Primary Examiner* — Shelley M Self
*Assistant Examiner* — Mohammed S. Alawadi
(74) *Attorney, Agent, or Firm* — Pizarro Allen PC

(57) ABSTRACT

A wood grinding machine may have a vibration detection system including one or more vibration sensors. The vibration detection system may include a trip point representative of a maximum allowable level of vibration. If a vibration signal from the one or more vibration sensors exceeds the trip point, a trip protocol may be executed to automatically stop the grinding process. Related methods are also disclosed.

31 Claims, 19 Drawing Sheets

WOOD GRINDING MACHINE WITH VIBRATION DETECTION SYSTEM AND RELATED METHODS

CROSS REFERENCE TO RELATED APPLICATIONS

None.

FIELD

This application relates generally to wood grinding machines.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In the field of wood grinding machines, one challenge is that the grinding operations may cause excessive vibration of the machine, particularly for wood grinding machines that have upward or downward swinging hammers on a rotating hammermill, for example, or another type of grinding rotor. Excessive vibration is generally undesirable because it may cause various components of the machine to wear out too quickly and may cause unsafe operating conditions for personnel in the vicinity of the machine. It would be a significant advancement in the art to provide a wood grinding machine that could readily detect excessive vibration and automatically shut down the machine if excessive vibration occurs.

SUMMARY

In some embodiments, a wood grinding machine for grinding wood material may include: an engine; a clutch configured for engagement and disengagement with respect to the engine; a grinding rotor configured for rotation about a first axis to grind the wood material; the grinding rotor being rotationally driven by the engine in a grinding direction of rotation when the clutch is engaged with the engine; a feedwheel configured for rotation about a second axis in a forward rotational direction for moving the wood material into engagement with the grinding rotor and a reverse rotational direction for moving the wood material away from the grinding rotor; a feedwheel motor configured for driving the feedwheel in the forward rotational direction and the reverse rotational direction; an infeed including an infeed bed chain configured for moving the wood material in a forward direction toward the feedwheel and a reverse direction away from the feedwheel; an infeed bed chain drive configured for driving the infeed bed chain in the forward direction and the reverse direction; a processor in communication with the engine, the clutch, the feedwheel motor, and the infeed bed chain drive; a memory including instructions executable by the processor; a control panel in communication with the processor; and at least one vibration sensor mounted proximate the grinding rotor and being in communication with the processor; the at least one vibration sensor being configured for generating a vibration signal indicative of a level of vibration of the grinding rotor and sending the vibration signal to the processor; wherein the instructions include instructions for: establishing a grinding mode including a trip point representative of a maximum allowable level of vibration; monitoring the vibration signal in relation to the trip point; and if the vibration signal exceeds the trip point, activating a trip protocol including: stopping and reversing the feedwheel and the infeed bed chain, idling the engine, disengaging the clutch from the engine, and displaying an indication of a trip condition on the control panel.

In some embodiments, the wood grinding machine may further include a material discharge conveyor configured for receiving ground wood material from the grinding rotor and discharging the ground wood material from the wood grinding machine. In some embodiments, the trip point may include a pre-set value. In some embodiments, the trip point may include a user defined value. In some embodiments, the at least one vibration sensor may include an accelerometer. In some embodiments, the instructions may further include instructions for: establishing a coarse signal adjustment value; and establishing a fine signal adjustment value. In some embodiments, the trip point, the coarse signal adjustment value, and the fine signal adjustment value may be established by selection of a grinding mode. In some embodiments, the at least one vibration sensor may include a first accelerometer disposed on a first bearing of the grinding rotor and a second accelerometer disposed on a second bearing of the grinding rotor. In some embodiments, the instructions may further include instructions for: establishing a first trip point representative of a maximum allowable level of vibration associated with the first bearing; establishing a second trip point representative of a maximum allowable level of vibration associated with the second bearing; and activating the trip protocol if a vibration signal from either the first accelerometer or the second accelerometer exceeds the first or second trip point, respectively. In some embodiments, the first trip point and the second trip point may be user defined. In some embodiments, the instructions may further include instructions for displaying on the control panel an indication of a value for each of the vibration signals from the first and second accelerometers. In some embodiments, the indication of a value for each of the vibration signals may include a graphical gauge. In some embodiments, the indication of a value for each of the vibration signals may include a numerical indication. In some embodiments, the trip protocol may further include displaying one or more warning messages on the control panel. In some embodiments, the forward rotational direction of the feedwheel may be opposite the grinding direction of rotation of the grinding rotor. In some embodiments, the forward rotational direction of the feedwheel may be the same as the grinding direction of rotation of the grinding rotor. In some embodiments, the feedwheel motor may include a hydraulic motor disposed within the feedwheel. In some embodiments, the grinding rotor may include a hammermill including a plurality of hammers.

In some embodiments, a method of operating a wood grinding machine to grind wood material is disclosed. The wood grinding machine may include an engine, a clutch engageable with and disengageable from the engine, a rotationally mounted grinding rotor configured for engagement with the wood material as the grinding rotor rotates in a grinding direction of rotation when the clutch is engaged with the engine, a feedwheel driven by a feedwheel motor and configured for forward rotation and reverse rotation, an infeed bed chain driven by an infeed bed chain drive and configured for moving the wood material in a forward direction toward the feedwheel and a reverse direction away from the feedwheel, and a vibration detection system including a processor in communication with the engine, the clutch, the feedwheel motor, and the infeed bed chain drive, a memory including instructions executable by the processor, a control panel in communication with the processor, and at least one vibration sensor in communication with the processor, the control panel including a display having an indication of a vibration signal generated by the at least one vibration sensor. The method may include: turning on the vibration detection system; selecting a grinding mode including a trip point; activating the grinding rotor, the infeed bed chain, and the feedwheel; feeding the wood material onto the infeed bed chain to begin a grinding process; monitoring the vibration signal; if the vibration signal exceeds the trip point, waiting for the vibration detection system to execute a trip protocol including stopping and reversing the feedwheel and the infeed bed chain, idling the engine, disengaging the clutch from the engine, and displaying an indication of a trip condition on the control panel; removing any unwanted material from the wood grinding machine; resetting the vibration detection system; and resuming the grinding process.

In some embodiments, a wood grinding machine for grinding wood material may include: an engine; a clutch configured for engagement and disengagement with respect to the engine; a grinding rotor configured for rotation about a first axis to grind the wood material; the grinding rotor being rotationally driven by the engine in a grinding direction of rotation when the clutch is engaged with the engine; a tub configured for rotation about a second axis in a forward rotational direction for moving the wood material into engagement with the grinding rotor and a reverse rotational direction for moving the wood material away from the grinding rotor; a tub drive motor configured for driving the tub in the forward rotational direction and the reverse rotational direction; a processor in communication with the engine, the clutch, and the tub drive motor; a memory including instructions executable by the processor; a control panel in communication with the processor; and at least one vibration sensor mounted proximate the grinding rotor and being in communication with the processor; the at least one vibration sensor being configured for generating a vibration signal indicative of a level of vibration of the grinding rotor and sending the vibration signal to the processor; wherein the instructions include instructions for: establishing a grinding mode including a trip point representative of a maximum allowable level of vibration; monitoring the vibration signal in relation to the trip point; and if the vibration signal exceeds the trip point, activating a trip protocol including: stopping and reversing the tub, idling the engine, disengaging the clutch from the engine, and displaying an indication of a trip condition on the control panel.

In some embodiments, a method of operating a wood grinding machine to grind wood material is disclosed. The wood grinding machine may include an engine, a clutch engageable with and disengageable from the engine, a rotationally mounted grinding rotor configured for engagement with the wood material as the grinding rotor rotates in a grinding direction of rotation when the clutch is engaged with the engine, a tub driven by a tub drive motor and configured for forward rotation for moving the wood material in a forward direction toward the grinding rotor and reverse rotation for moving the wood material in a reverse direction away from the grinding rotor, and a vibration detection system including a processor in communication with the engine, the clutch, and the tub drive motor, a memory including instructions executable by the processor, a control panel in communication with the processor, and at least one vibration sensor in communication with the processor, the control panel including a display having an indication of a vibration signal generated by the at least one vibration sensor. The method may include: turning on the vibration detection system; selecting a grinding mode including a trip point; activating the grinding rotor and the tub; feeding the wood material into the tub to begin a grinding process; monitoring the vibration signal; if the vibration signal exceeds the trip point, waiting for the vibration detection system to execute a trip protocol including stopping and reversing the tub, idling the engine, disengaging the clutch from the engine, and displaying an indication of a trip condition on the control panel; removing any unwanted material from the wood grinding machine; resetting the vibration detection system; and resuming the grinding process.

In some embodiments, a wood grinding machine for grinding wood material may include: an engine; a clutch configured for engagement and disengagement with respect to the engine; a grinding rotor configured for rotation about a first axis to grind the wood material; the grinding rotor being rotationally driven by the engine in a grinding direction of rotation when the clutch is engaged with the engine; a feedworks configured for moving the wood material in a forward direction toward the grinding rotor and a reverse direction away from the grinding rotor; a processor in communication with the engine, the clutch, and the feedworks; a memory including instructions executable by the processor; a control panel in communication with the processor; and at least one vibration sensor mounted on the wood grinding machine and being in communication with the processor; the at least one vibration sensor being configured for generating a vibration signal indicative of a level of vibration of the wood grinding machine and sending the vibration signal to the processor; wherein the instructions include instructions for: establishing a grinding mode including a trip point representative of a maximum allowable level of vibration; monitoring the vibration signal in relation to the trip point; and if the vibration signal exceeds the trip point, activating a trip protocol including: stopping and reversing the feedworks, idling the engine, disengaging the clutch from the engine, and displaying an indication of a trip condition on the control panel.

In some embodiments, the trip protocol may further include locking the grinding rotor. In some embodiments, the locking may include electrically locking the grinding rotor. In some embodiments, the locking may include mechanically locking the grinding rotor. In some embodiments, the feedworks may include: a feedwheel configured for rotation about a second axis in a forward rotational direction for moving the wood material into engagement with the grinding rotor and a reverse rotational direction for moving the wood material away from the grinding rotor; a feedwheel motor configured for driving the feedwheel in the forward rotational direction and the reverse rotational direction; an infeed including an infeed bed chain configured for moving the wood material in a first direction toward the feedwheel and a second direction away from the feedwheel; and an infeed bed chain drive configured for driving the infeed bed chain in the first direction and the second direction. In some embodiments, the feedworks may include: a tub configured for rotation about a second axis in a forward rotational direction for moving the wood material into engagement with the grinding rotor and a reverse rotational direction for moving the wood material away from the grinding rotor; and a tub drive motor configured for driving the tub in the forward rotational direction and the reverse rotational direction. In some embodiments, the grinding mode may be selectable from a plurality of grinding modes. In some embodiments, the grinding mode may further include at least one parameter selected from coarse signal adjustment, fine signal adjustment, engine speed, grinding rotor speed, feed speed, and type of material.

DETAILED DESCRIPTION

Figure 1:
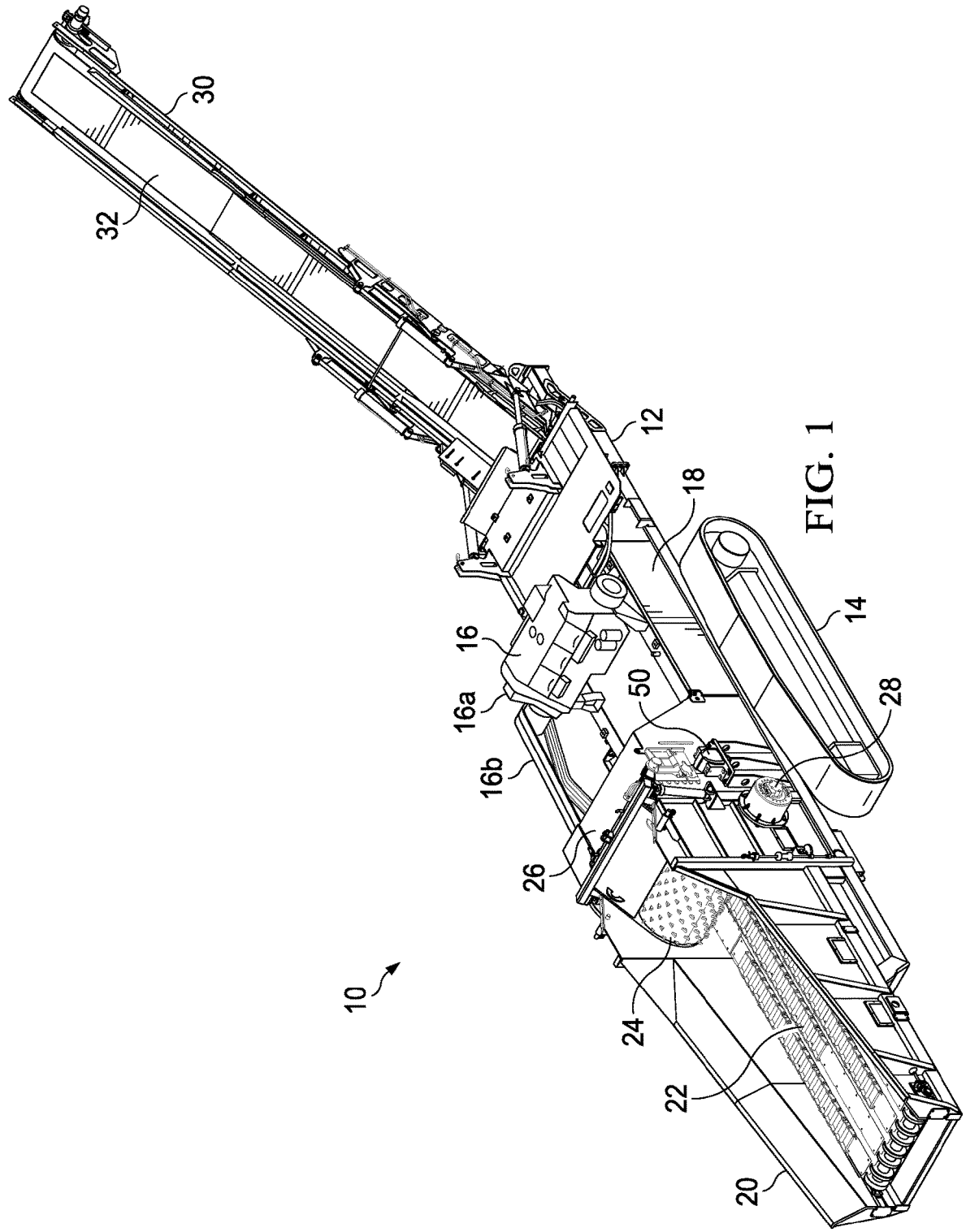
FIG. 1 is a perspective view of a wood grinding machine.
Figure 2:
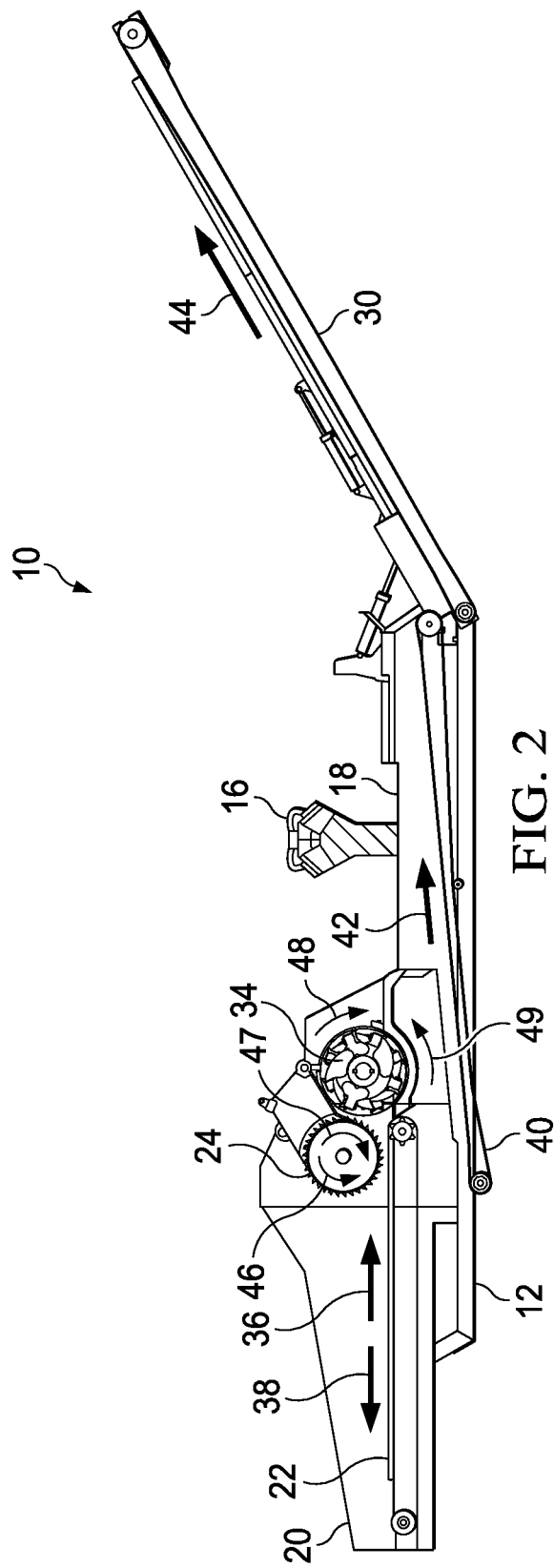
FIG. 2 is a left side schematic view of the machine of FIG. 1 without the undercarriage.
Figure 3:
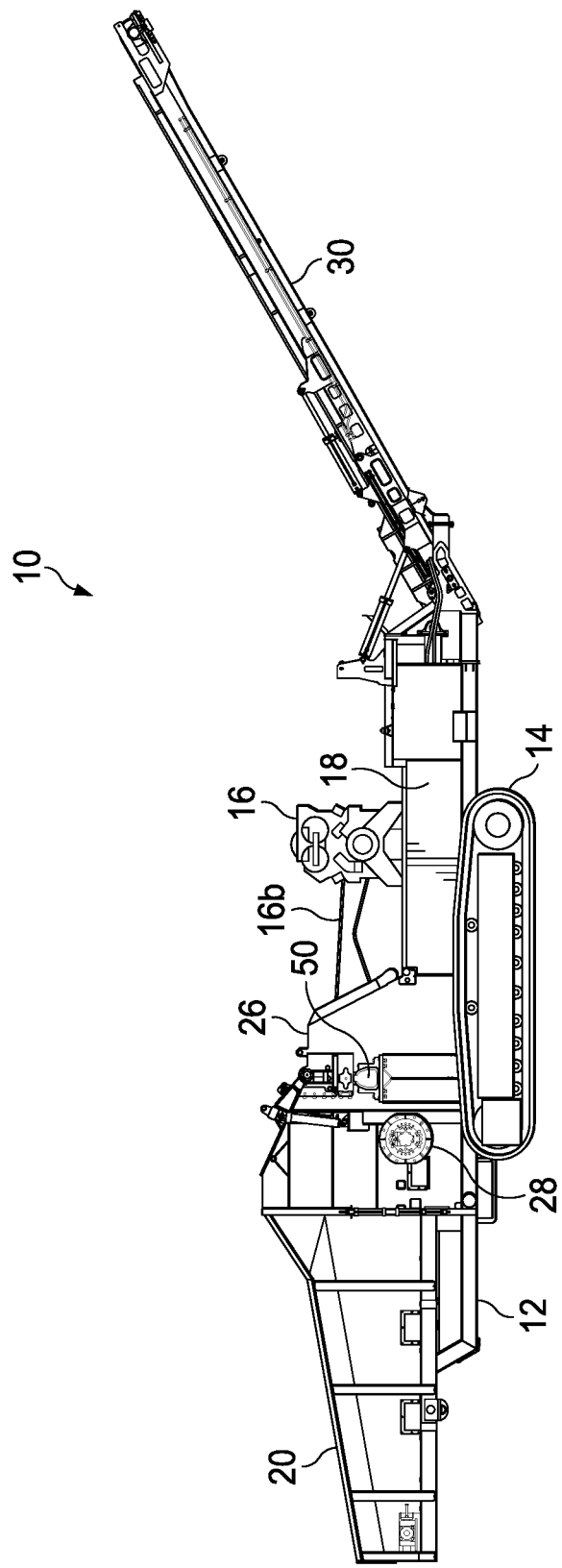
FIG. 3 is a left side elevational view of the machine of FIG. 1.
Figure 4:
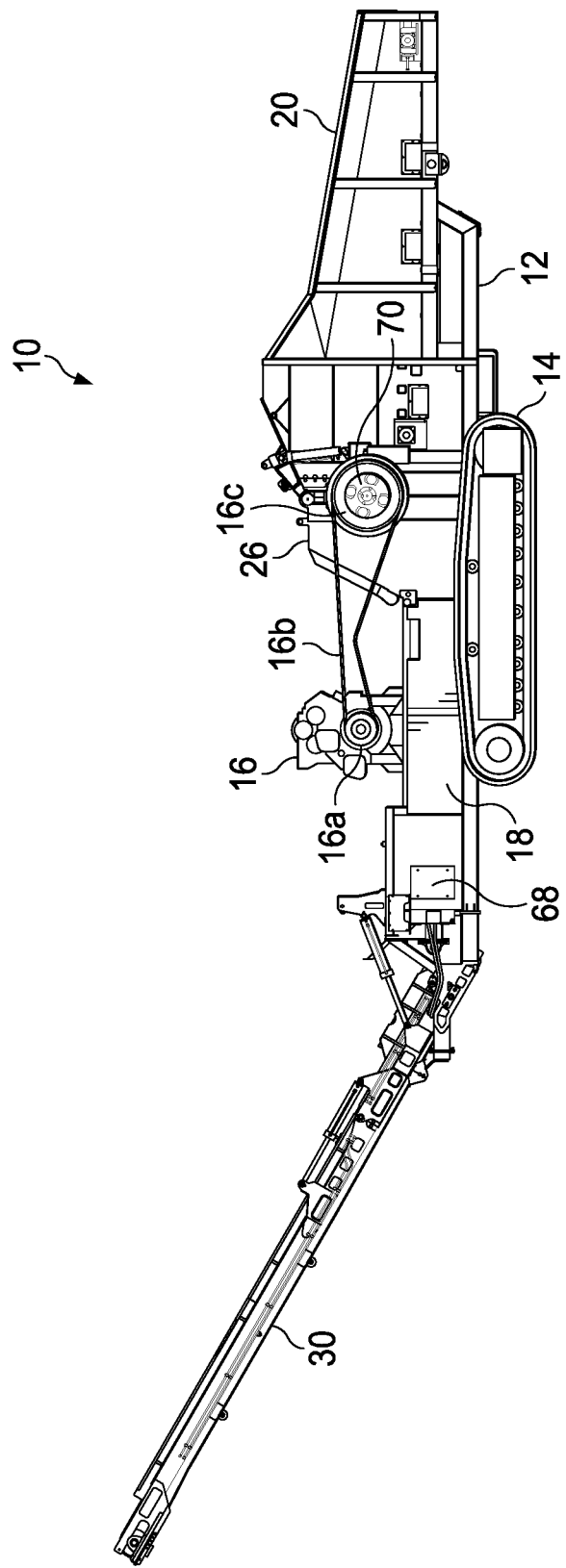
FIG. 4 is a right side elevational view of the machine of FIG. 1.
Figure 5:
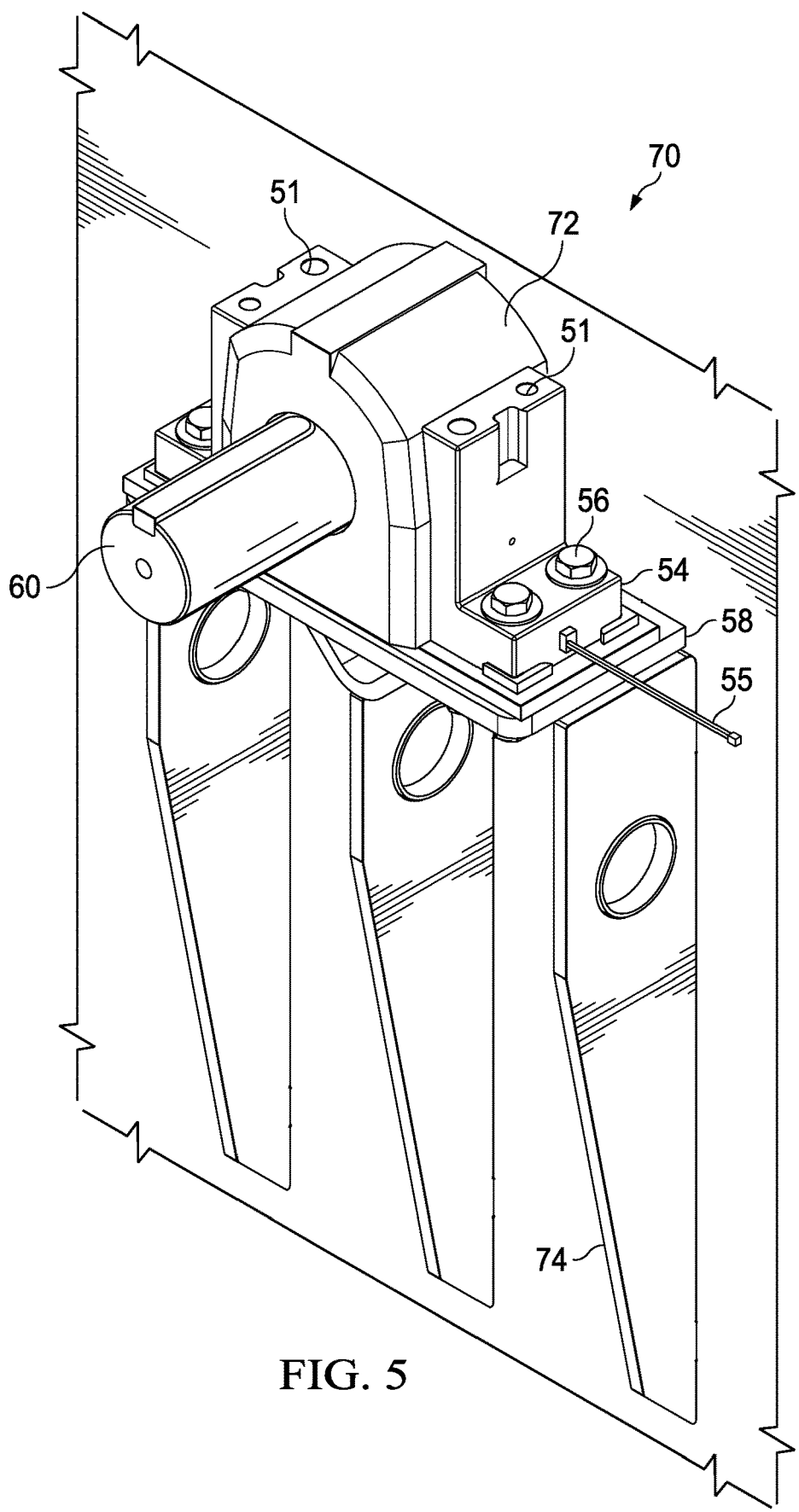
FIG. 5 is a perspective view of the drive side mill bearing of the machine of FIG. 1.
Figure 6:
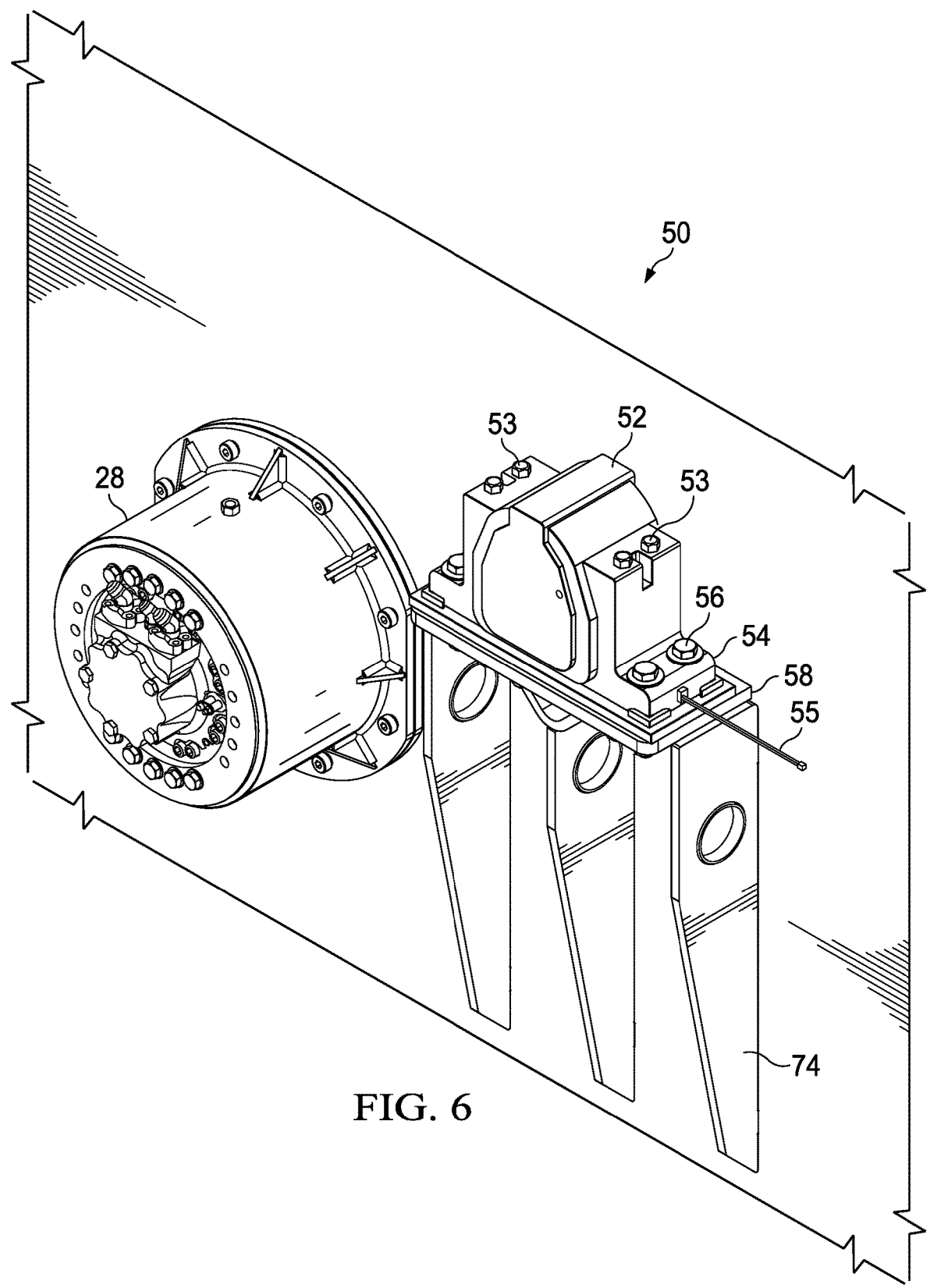
FIG. 6 is a perspective view of the idle side mill bearing of the machine of FIG. 1.

As used herein, the following terms should be understood to have the indicated meanings:

When an item is introduced by "a" or "an," it should be understood to mean one or more of that item.

"Communication" means the transmission of one or more signals from one point to another point. Communication between two objects may be direct, or it may be indirect through one or more intermediate objects. Communication in and among computers, I/O devices and network devices may be accomplished using a variety of protocols. Communication protocols may include, for example, signaling, error detection and correction, data formatting and address mapping. For example, communication protocols may be provided according to the seven-layer Open Systems Interconnection model (OSI model), the TCP/IP model, or any other suitable model.

"Comprises" means includes but is not limited to.

"Comprising" means including but not limited to.

"Computer readable medium" means a tangible, non-transitory article of manufacture having a capacity for storing one or more computer programs, one or more pieces of data, or a combination thereof. A computer readable medium may include but is not limited to a computer memory, hard disk, memory stick, magnetic tape, floppy disk, optical disk (such as a CD or DVD), zip drive, or combination thereof.

"GUI" means graphical user interface.

"Having" means including but not limited to.

"I/O device" means any hardware that can be used to provide information to and/or receive information from a computer. Exemplary I/O devices include disk drives, keyboards, video display screens, mouse pointers, printers, card readers, scanners (such as barcode, fingerprint, iris, QR code, and other types of scanners), RFID devices, tape drives, touch screens, video cameras, still cameras, movement sensors, network cards, storage devices, microphones, audio speakers, styli and transducers, and associated interfaces and drivers.

"Memory" means any computer readable medium in which information can be temporarily or permanently stored and retrieved. Examples of memory include various types of RAM and ROM, such as SRAM, DRAM, Z-RAM, flash, optical disks, magnetic tape, punch cards, and EEPROM. Memory may be virtualized and may be provided in or across one or more devices and/or geographic locations, such as RAID technology, for example.

"Network" means any system of communication, such as a cellular network, the Internet, intranet, local area network (LAN), wide area network (WAN), Metropolitan Area Network (MAN), other types of area networks, cable television network, satellite network, telephone network, public networks, private networks, wired or wireless networks, virtual, switched, routed, fully connected, and any combination and subnetwork thereof. A network may use a variety of network devices, such as routers, bridges, switches, hubs, repeaters, converters, receivers, proxies, firewalls, translators and the like. Network connections may be wired or wireless, and may use multiplexers, network interface cards, modems, IDSN terminal adapters, line drivers, and the like. The network may comprise any suitable topology, such as point-to-point, bus, star, tree, mesh, ring and any combination or hybrid thereof.

"Processor" means any programmable machine capable of accepting input, processing the input according to a program, and producing output.

"Program" means any sequence of instructions, such as an algorithm, whether in a form that can be executed by a computer (object code), in a form that can be read by humans (source code), or otherwise. A program may comprise or call one or more data structures and variables. A program may be embodied in hardware, firmware, software, or a combination thereof. A program may be created using any suitable programming language, such as C, C++, Java, Perl, PHP, Ruby, SQL, and others. Computer software may comprise one or more programs and related data. Examples of computer software include system software (such as operating system software, device drivers and utilities), middleware (such as web servers, data access software and enterprise messaging software), application software (such as databases and media players), firmware (such as software installed on calculators, keyboards and mobile phones), and programming tools (such as debuggers, compilers and text editors).

"Signal" means a detectable physical phenomenon that is capable of conveying information. A signal may include but is not limited to an electrical signal, an electromagnetic signal, an optical signal, an acoustic signal, or a combination thereof.

Figure 7:
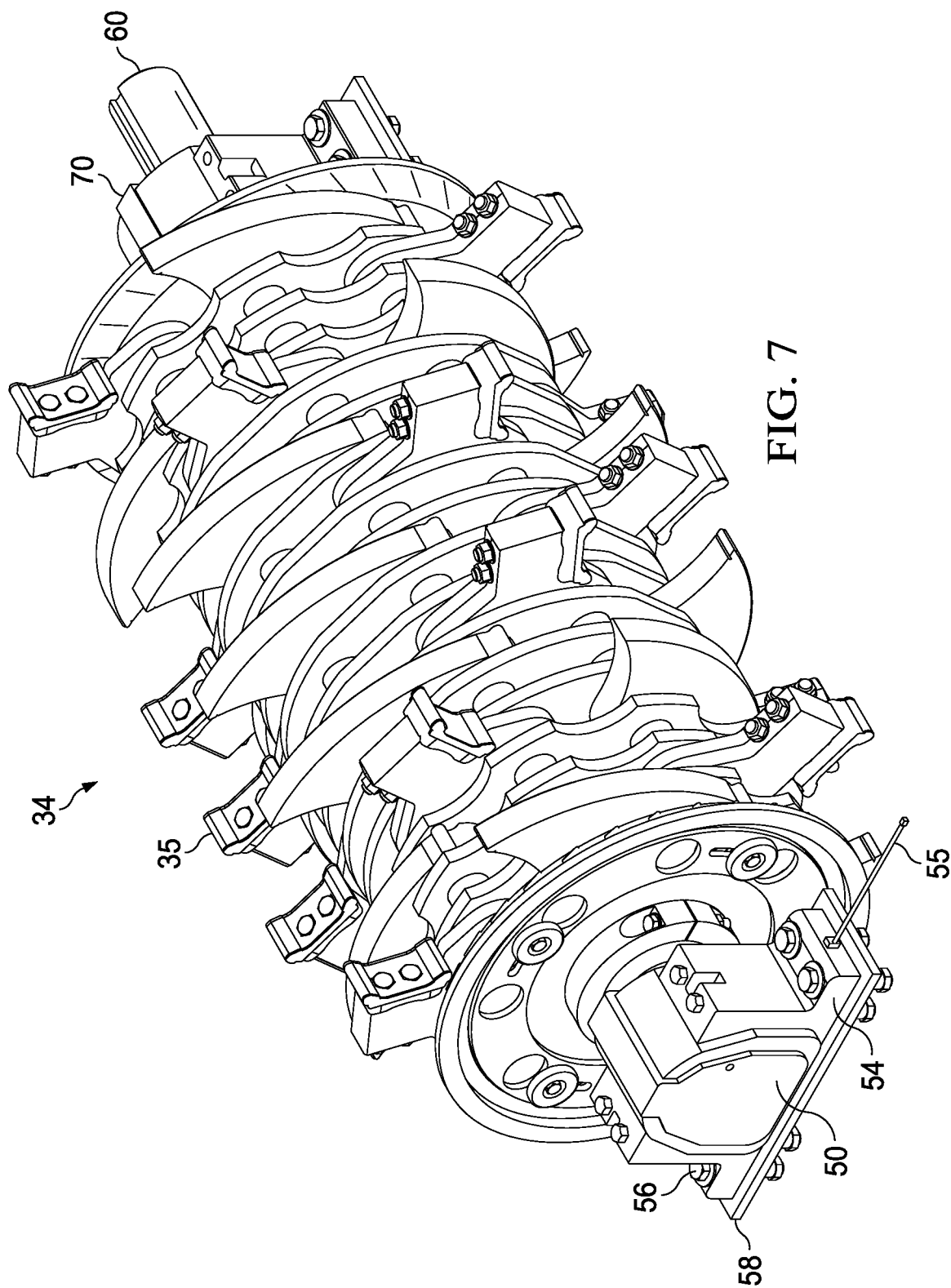
FIG. 7 is a perspective view of the grinding rotor, drive side mill bearing, and idle side mill bearing of the machine of FIG. 1.
Figure 8:
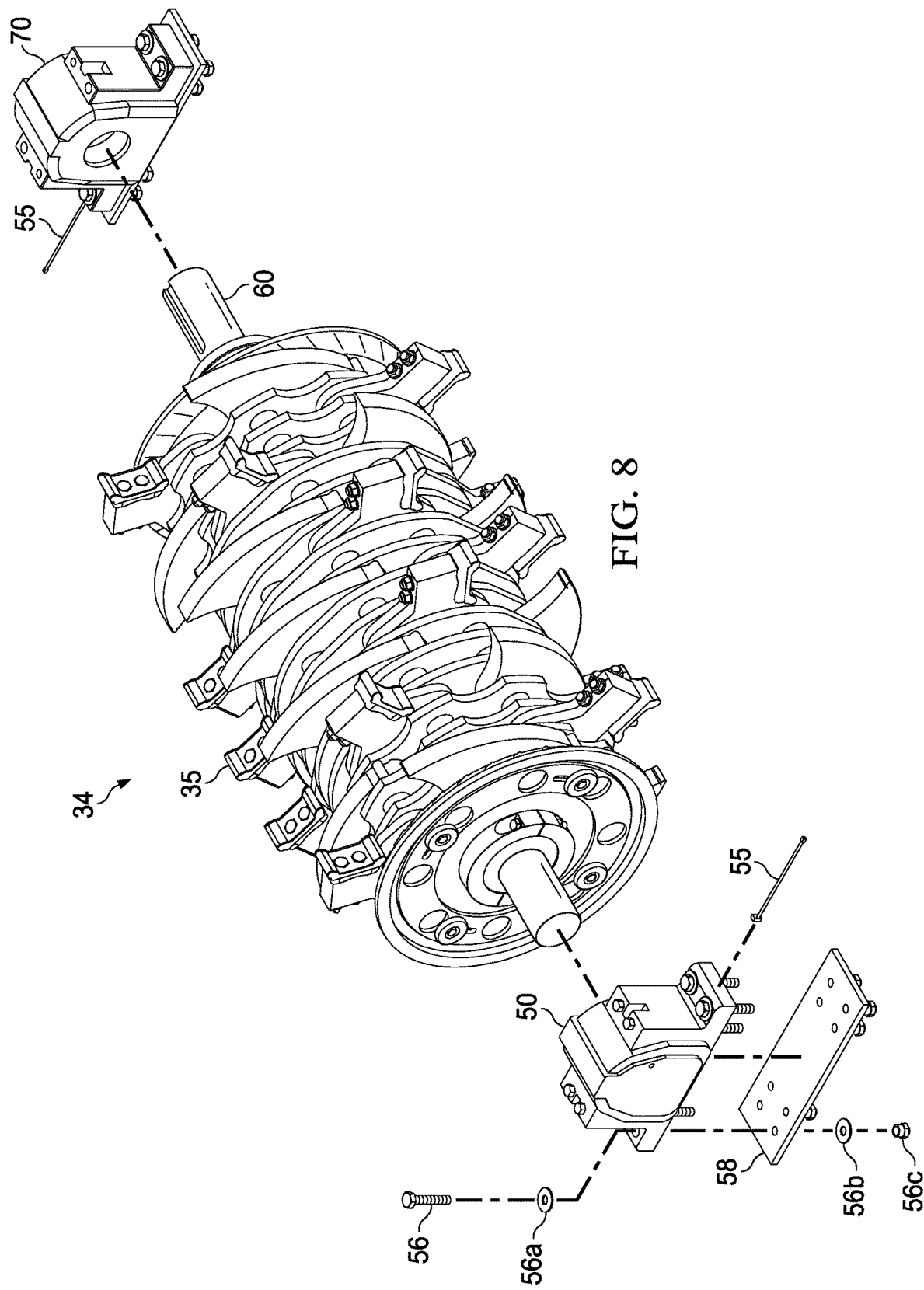
FIG. 8 is an exploded perspective view of the grinding rotor, drive side mill bearing, and idle side mill bearing of the machine of FIG. 1.

As shown in FIGS. 1-4, a wood grinding machine 10 may include a frame 12 having an engine 16 mounted on an engine platform 18, an infeed 20, a feedwheel 24, and a grinding chamber 26 mounted on frame 12. In some embodiments, frame 12 may be mounted to an undercarriage 14 to provide mobility for wood grinding machine 10. Alternatively, some embodiments may be stationary. Infeed 20 may include one or more infeed bed chains 22 configured for feeding wood material into wood grinding machine 10 for grinding in grinding chamber 26. Bed chains 22 may be driven by a bed chain drive 28 and configured for moving in a forward direction 36 and a reverse direction 38. Feedwheel 24 may be rotatably mounted to wood grinding machine 10 and configured for rotation in a forward direction 46 and a reverse direction 47. Feedwheel 24 may be driven by a hydraulic motor (e.g., within the feedwheel itself or operably connected to the feedwheel) or other suitable means. Engine 16 may be operatively engageable with a clutch 16a configured to rotatably drive a driven sheave 16c via one or more drive belts 16b. Driven sheave 16c may be connected to or part of a grinding rotor 34 (such as a hammermill having a plurality of hammers 35, for example), which may be rotatably mounted to a drive side rotor bearing 70 and an idle side rotor bearing 50. Grinding rotor 34 may be driven in an upswing direction 48 or a downswing direction 49. Drive side rotor bearing 70 may have a housing 72, and idle side rotor bearing 50 may have a housing 52. Wood grinding machine 10 may have a control panel 68 (see FIG. 4) configured for controlling the operation of wood grinding machine 10 as described further below. As shown in FIGS. 7 and 8, grinding rotor 34 may have a plurality of hammers 35 or other suitable grinding tools (e.g., teeth, nibs, knurls, blades, or the like) configured for grinding the wood stock as it is fed through wood grinding machine 10. Wood grinding machine 10 may have one or more conveyors configured to receive ground up wood material from grinding rotor 34 and discharge it from wood grinding machine 10. For example, wood grinding machine 10 may have a first material discharge conveyor 40 configured for receiving ground up wood material as it falls downward beneath grinding rotor 34. First material discharge conveyor 40 may transport the ground up wood material in a forward direction 42 to a second material discharge conveyor 30, which in turn may transport the ground up wood material in a forward direction 44 on conveyor belt 32 and deposit the ground up wood material in a repository such as a dump truck, for example (not shown). Of course, any suitable conveyor arrangement may be used, and some embodiments may not have a conveyor.

Referring to FIGS. 5-8, drive side rotor bearing 70 and idle side rotor bearing 50 may be mounted to one or more mill bearing supports 74 with one or more mill bearing support pads 58. Mill bearing support pads 58 may be welded, bolted, or otherwise attached to or integral with mill bearing supports 74. In some embodiments, mill bearing supports 74 may be attached to or integral with one or more walls that enclose grinding chamber 26, for example. In some embodiments, drive side rotor bearing 70 and idle side rotor bearing 50, as well as each mill bearing support pad 58, may have a plurality of holes 51 configured for receiving a respective plurality of bolts 53 for attaching drive side rotor bearing 70 and idle side rotor bearing 50 to mill bearing supports 74. In some embodiments, each of drive side rotor bearing 70 and idle side rotor bearing 50 may include a mill bearing flange 54 on its forward and rearward sides. Each mill bearing flange 54 may include a plurality of holes configured for receiving a respective plurality of mill bearing hold down bolts 56, which may be used in cooperation with mill bearing hold down top washers 56a, mill bearing hold down bottom washers 56b, and mill bearing hold down nuts 56c to help securely fasten drive side rotor bearing 70 and idle side rotor bearing 50 to mill bearing support pads 58. Of course, any suitable means of attachment may be used to fasten drive side rotor bearing 70 and idle side rotor bearing 50 to a stable structure of wood grinding machine 10. Each of drive side rotor bearing 70 and idle side rotor bearing 50 may be configured to receive an end of a mill shaft 60 of grinding rotor 34 such that grinding rotor 34 may rotate about the central axis of mill shaft 60.

Still referring to FIGS. 5-8, one or more vibration sensors 55, such as accelerometers, for example, may be installed on or near drive side rotor bearing 70 and idle side rotor bearing 50. For example, in some embodiments, vibration sensors 55 may be mounted to respective mill bearing flanges 54. Vibration sensors 55 may be configured for communication with a processor 76 to form a vibration detection system as described further below.

Figure 9:
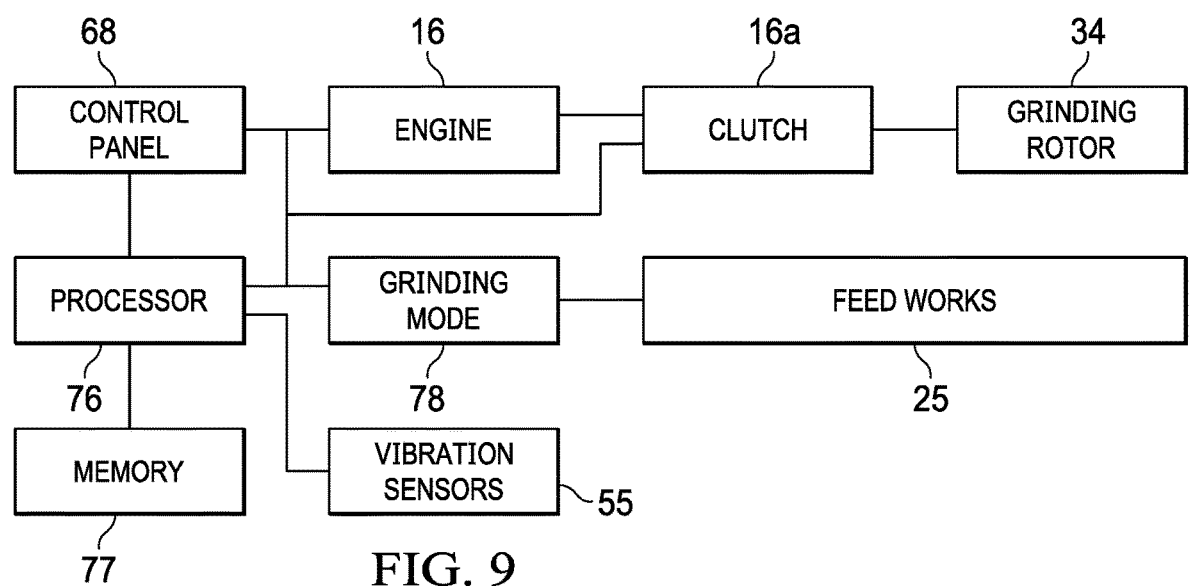
FIG. 9 is a schematic block diagram of the machine of FIG. 1.

As illustrated in FIG. 9, control panel 68 may be in communication with a processor 76, which may be in communication with a memory 77. Processor 76 may be programmed with instructions stored in memory 77 for carrying out the processes described herein. Control panel 68 and processor 76 may be in communication with engine 16 and clutch 16a and may be configured for setting a grinding mode 78 for operation of wood grinding machine 10. Output signals from vibration sensors 55 may be received by processor 76 and used for controlling operation of engine 16, clutch 16a, grinding rotor 34, and feedworks 25 (including infeed bed chain 22 and feedwheel 24 in this example) as described further below. In some embodiments, control panel 68, processor 76, memory 77, and vibration sensors 55 may be part of a network that may include one or more other processors in communication therewith. For example, in some embodiments, wood grinding machine 10 may be operated remotely from a processor that is in communication with control panel 68.

Figure 10:
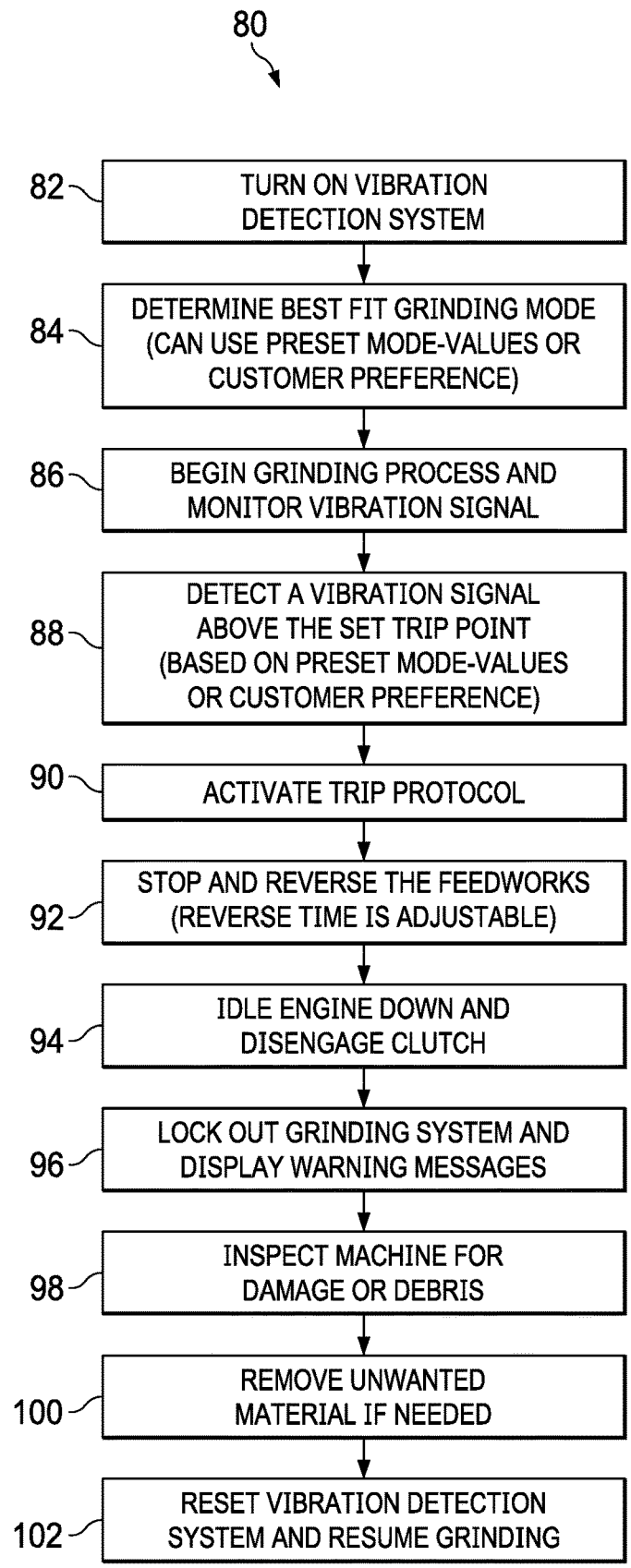
FIG. 10 is a flow chart of a method of operating the machine of FIG. 1.
Figure 11:
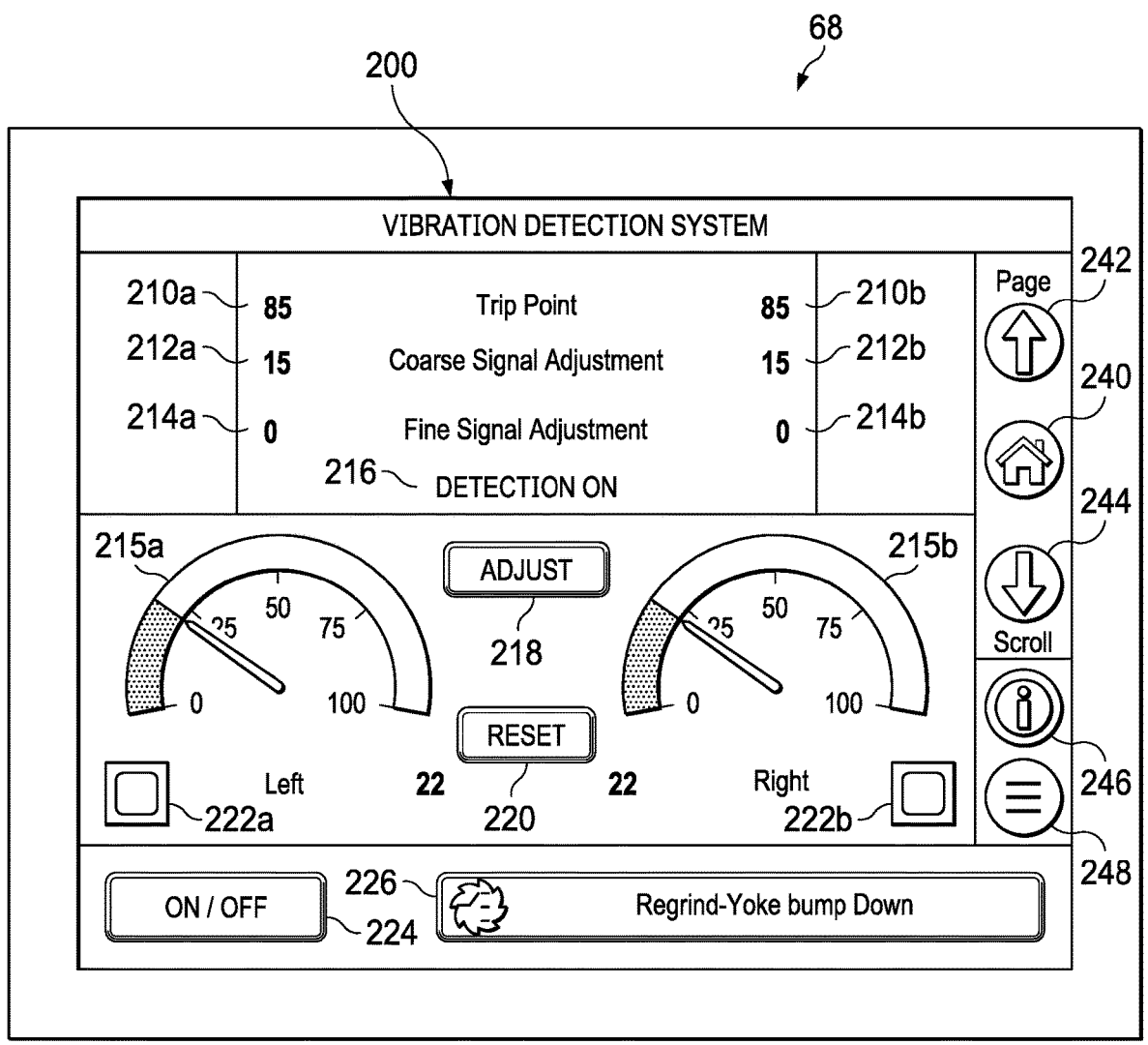
FIG. 11 is a screen shot of the control panel of the machine of FIG. 1.

As illustrated in FIG. 10, and with further reference to FIGS. 11-14 (which illustrate sample GUI touch screens of control panel 68), processor 76 may be programmed to carry out a process 80 for controlling operation of wood grinding machine 10 in conjunction with control panel 68 and in response to signals from vibration sensors 55. As shown at step 82, the vibration detection system may be turned on via on/off button 224 on control panel 68. As shown at step 84, the user may select a grinding mode 78 via grinding mode selection button 226. In some embodiments, the grinding mode may have one or more pre-set values that define one or more characteristics of the grinding mode, such as a trip point, coarse signal adjustment, fine signal adjustment, engine speed, or other parameters, for example. Alternatively, in some embodiments, the user may specify one or more of those values. In some embodiments, one or more of the grinding mode values may be pre-set and one or more of the grinding mode values may be user defined. In step 86, the user may begin the grinding process by activating feedworks 25 and grinding rotor 34, and the vibration detection system may monitor the signals generated by vibration sensors 55 during the grinding process or during a service or maintenance process, such as a checkup to determine whether the grinding rotor is out of balance, or whether a rotor bearing is defective, for example. As shown in step 88, the vibration detection system may detect a vibration signal that is above the established trip point. If that occurs, the vibration detection system may activate a trip protocol as indicated at step 90. If the trip protocol is activated, the vibration detection system may stop and reverse the feedworks 25 as indicated at step 92, idle the engine 16 and disengage the clutch 16*a* as indicated at step 94, and lock out the grinding system (e.g., grinding rotor 34, either electrically, mechanically, or both) and display one or more warning messages, such as warning messages 236 and 238, for example, as indicated at step 96. In some embodiments, grinding machine 10 may also activate one or more audible or visual indicators, such as horns or flashing lights, for example, or a combination thereof, to alert a user when the vibration detection system is tripped. As indicated at step 98, the user may then inspect grinding machine 10 for damage or unwanted debris and remove any unwanted material from wood grinding machine 10, if necessary, as indicated at step 100. The user may then reset the vibration detection system by pressing button 220 and resume grinding operations as indicated at step 102.

Some exemplary grinding modes for wood grinding machine 10 are illustrated in Table 1 and described below. Of course, any suitable parameters and settings may be used, depending on the circumstances. Engine speed and grinding rotor speed may be defined in terms of RPM (revolutions per minute) or other suitable manner.

TABLE 1

| Grinding Mode | Feed Speed | Engine Speed | Coarse Signal Setting | Fine Signal Setting | Trip Point |
|---|---|---|---|---|---|
| Trees & Stumps | High | High | 9 | 0 | 80 |
| Green Waste | Medium | High-Medium | 10 | 0 | 80 |
| Brush | Medium | High-Medium | 12 | 0 | 80 |
| Construction and Demolition | High to Medium | High | 14 | 0 | 85 |
| Regrind | Medium | Medium | 15 | 0 | 85 |
| Large Logs and Chunks | Medium | High | 8 | 0 | 85 |

Trees & Stumps: This mode may be used to efficiently proportion the feedworks to get material into the grinding rotor in an aggressive fashion. In some embodiments, the grinding machine may attempt to work at a higher range of engine RPM (e.g., about 1800 to 2050 RPM) (which may correspond to a grinding rotor speed of about 900 to 1025 RPM, for example) allowing quick engine recovery when RPM drop is experienced. Vibration is typically high during grinding of this type of material.

Green Waste: This mode may be used to efficiently proportion the feedworks to get material into the grinding rotor in a low to medium fashion. In some embodiments, the grinding machine may attempt to work at the high to medium engine RPM range (e.g., about 1700 to 2050 RPM) (which may correspond to a grinding rotor speed of about 850 to 1025 RPM, for example) allowing a larger window before feeding is slowed or stopped. Vibration is typically medium during grinding of this type of material.

Brush: This mode may be used to efficiently proportion the feedworks to get material into the grinding rotor in a low to medium fashion. In some embodiments, the grinding machine may attempt to work at the high to medium engine RPM range (e.g., about 1700 to 2050 RPM) (which may correspond to a grinding rotor speed of about 850 to 1025 RPM, for example) allowing a larger window before feeding is slowed or stopped. Vibration is typically medium-low during grinding of this type of material.

Construction & Demolition: This mode may be used to evenly run the feedworks. In some embodiments, the grinding machine may attempt to work at the high to medium engine RPM range (e.g., about 1700 to 2050 RPM) (which may correspond to a grinding rotor speed of about 850 to 1025 RPM, for example) allowing a larger window before feeding is slowed or stopped. Vibration is typically high-medium during grinding of this type of material.

Regrind: This mode may be used to steadily run the feedworks. In some embodiments, the grinding machine may attempt to work during a medium engine RPM range (e.g., about 1700 to 1900 RPM) (which may correspond to a grinding rotor speed of about 850 to 950 RPM, for example) allowing a more consistent flow of material before the feeding is slowed or stopped. Vibration is typically low during grinding of this type of material.

Large Logs & Chunks: This mode may be used to efficiently run the feedworks to get material into the grinding rotor in an aggressive fashion. In some embodiments, the grinding machine may attempt to work at a higher range of engine RPM (e.g., about 1800 to 2050 RPM) (which may correspond to a grinding rotor speed of about 900 to 1025 RPM, for example) allowing quick engine recovery when RPM drop is experienced. Vibration is typically high during grinding of this type of material.

Feed speed (the rate at which the feedworks are operated to feed wood material into the wood grinding machine), engine speed, and grinding rotor speed may be defined in any suitable manner, including a range or specific values or a combination thereof. For example, in some embodiments, feed speed may be defined as low (e.g., about 50 to 60 ft/min), medium (e.g., about 60 to 70 ft/min), or high (e.g., about 80 to 90 ft/min), or with specific speed values, or a combination thereof. For example, in some embodiments, engine speed may be defined as low (e.g., about 1500 to 1700 RPM), medium (e.g., about 1700 to 1850 RPM), or high (e.g., about 1850 to 2050 RPM), or with specific engine speed values, or a combination thereof. For example, in some embodiments, grinding rotor speed may be defined as low (e.g., about 750 to 850 RPM), medium (e.g., about 850 to 925 RPM), or high (e.g., about 925 to 1025 RPM), or with specific grinding rotor speed values, or a combination thereof. Of course, the foregoing ranges are exemplary and not limiting. Feed speed, engine speed, grinding rotor speed, and other characteristics may vary depending on a number of factors, including the machine type, model, sheave combination, configuration, size, operating conditions, and type of material being processed.

A wood grinding machine 10 with a vibration detection system as described herein may be configured based on the knowledge that for shredders with an upward or downward rotating/operating shredding rotor such as grinding rotor 34, for example, there are times when an excessive vibration can be experienced. Some conditions that may produce excessive vibrations may include an out of balance rotor, extremely hard wood, a defective rotor bearing, or non-shreddable material such as metal, for example. With a vibration detection system as described herein installed and turned on, vibration levels in the vicinity of the shredding rotor (e.g., grinding rotor 34) may be monitored constantly as the wood grinding machine 10 is running. Of course, the vibration sensors may be mounted at any suitable location on the wood grinding machine 10 to sense a vibration level of the machine. If a vibration is experienced over the trip point of the system, a sequence of actions may take place as described above in process 80. These actions may enable the user to eliminate whatever condition caused the excessive vibration and return the machine to normal operation, thereby preventing damage to and extending the useful life of the machine and avoiding potential harm to users or other persons in the area. Once the system has tripped and all trip actions have been completed, the system may be reset, the machine and any backed out material may be inspected, and the user may determine if the machine is okay to continue operation or if further work is needed. In some embodiments, all standard lock out and tag out procedures may still apply when inspecting and working on the machine.

Figure 12:
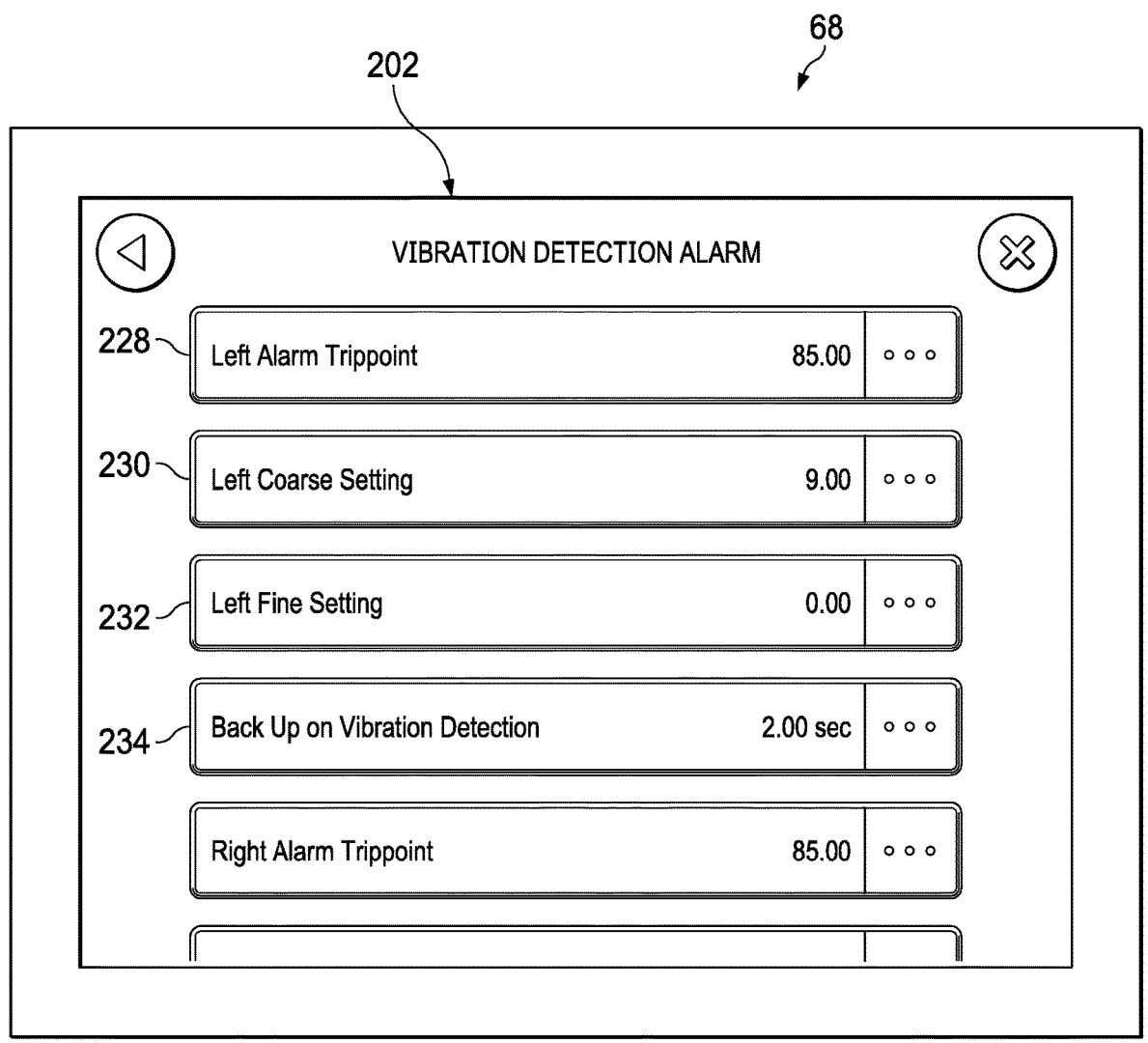
FIG. 12 is another screen shot of the control panel of the machine of FIG. 1.

In some embodiments, the vibration detection system may include two accelerometer sensors 55, with one on each bearing 50, 70 of grinding rotor 34 as shown in FIG. 8, for example. These sensors may be mounted proximate (e.g., on or near) the shredding rotor shaft (e.g., mill shaft 60) and may be hardwired directly into the control system (e.g., control panel 68) of the wood grinding machine 10. The control system may receive signals from the left and right sensors 55 (in this example, the left sensor is on bearing 70, and the right sensor is on bearing 50) to get vibration readings such as those shown at left signal gauge 215a and right signal gauge 215b (see FIGS. 11, 13, and 14). The vibration readings may be adjusted by increasing or decreasing the signal amplification via left and right coarse signal adjustment settings and left and right fine signal adjustment settings, which may be reflected in the control panel display by left and right coarse signal adjustment indicators 212a, 212b and left and right fine signal adjustment indicators 214a, 214b, respectively. The trip points of the system may also be adjusted up or down via left and right trip point settings, which may be reflected in the control panel display by left and right trip point indicators 210a, 210b. For example, FIG. 12 illustrates an exemplary display screen 202 of control panel 68 showing a left trip point setting 228, a left coarse signal adjustment setting 230, and a left fine signal adjustment setting 232 for the left vibration sensor 55. Similar settings may be provided for the right vibration sensor 55 (e.g., a right trip point setting, a right coarse signal adjustment setting, and a right fine signal adjustment setting) on the same or similar screen of control panel 68. A feedworks backup setting 234 may also be provided, by which a user may define a time period (e.g., 2.00 seconds or other suitable time period) for which the feedworks 25 may be run in reverse to back out problematic material from the grinding rotor 34 for removal in the event a trip point is exceeded. In some embodiments, the feedworks backup setting 234 may be selected or specified in a range from 0-10 seconds, for example, but any suitable value or range may be used. All relevant aspects of the vibration detection system may be viewed, adjusted, and calibrated by the operator from the control panel 68. In addition to monitoring vibration levels during normal grinding operations, a vibration detection system as described herein may be used by a service technician to get sample data from the wood grinding machine 10 to determine whether it is within acceptable vibration specifications.

Referring again to FIG. 11, which illustrates an exemplary screen 200 of control panel 68, if the vibration detection system detects a signal above the established trip point of the left or right vibration sensor 55, the system will trip and the trip protocol will activate. The higher the value of the trip point, the higher the signal required to trip the system. In some embodiments, the trip points may be set anywhere from 0 to 100, for example, but any suitable range may be used. The user may set the left and right trip point values by tapping the adjust button 218 and then selecting the left trip point or the right trip point (see, e.g., screen 202 in FIG. 12). In this example, the left and right trip points have been set to 85, and the left and right signal gauges 215a, 215b indicate a vibration level of 22, which is well below the trip point in each instance. Thus, the left and right vibration sensor status indicators 222a, 222b are shown in a first state, indicating that wood grinding machine 10 is operating in a normal condition without excessive vibration. In this example, the left and right coarse signal adjustment settings have been set to 15, and the left and right fine signal adjustment settings have been set to zero. These settings may be accessed by pressing the adjust button 218, which may cause a screen such as screen 202 to be displayed as shown in FIG. 12. The coarse signal adjustment settings may be used to make major adjustments to the intensity of the vibration signals. In some embodiments, the coarse signal adjustment settings may be set anywhere from 0 to 50, for example, but any suitable range may be used. The higher the value of the coarse signal adjustment settings, the more intense the signal will be, therefore increasing the system reading. In some embodiments, the coarse signal adjustment settings may be calibrated when the engine 16 is at high idle with the clutch 16a engaged. Because vibration levels on the drive side and the idle side may vary, each side may be calibrated differently in some embodiments. The fine signal adjustment settings are for fine-tuning the signal readings. The fine signal adjustment settings may be used to make minor adjustments to the intensity of the vibration signals. In some embodiments, the fine signal adjustment settings may be set anywhere from 0 to 50, for example, but any suitable range may be used. The higher the value of the fine signal adjustment setting, the more intense the signal will be, therefore increasing the system reading, but to a lesser degree than the coarse signal adjustment setting. In some embodiments, the fine signal adjustment settings may be calibrated when the engine 16 is at high idle with the clutch 16a engaged. Again, because vibration levels on the drive side and the idle side may vary, each side may be calibrated differently in some embodiments. A user may navigate within and among the various screens of control panel 68 using a page up button 242, a page down button 244, a home screen button 240, an information button 246, and a menu button 248. Of course, any suitable I/O devices may be used for entering information into control panel 68 and displaying information to a user.

Figure 13:
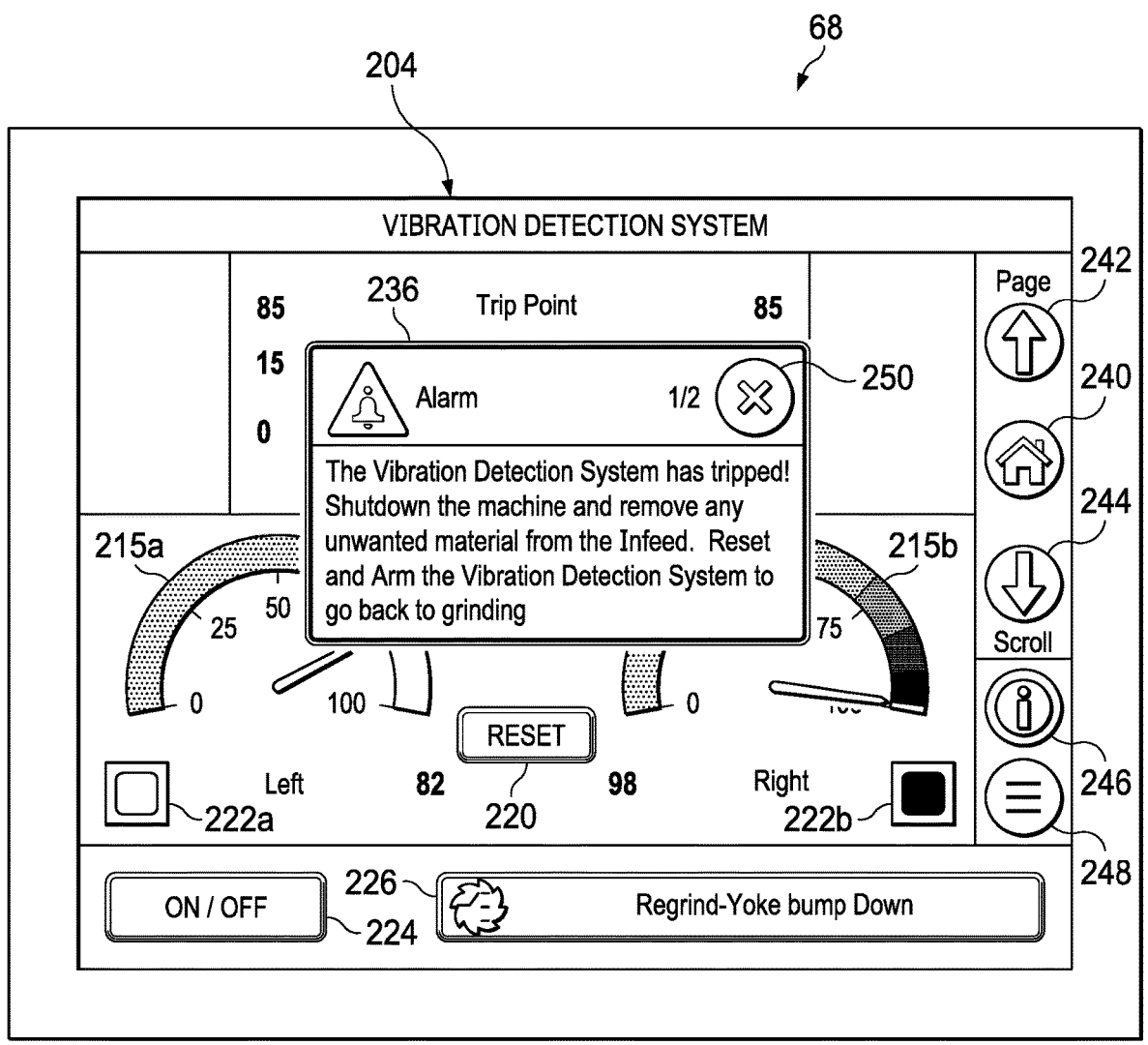
FIG. 13 is yet another screen shot of the control panel of the machine of FIG. 1.
Figure 14:
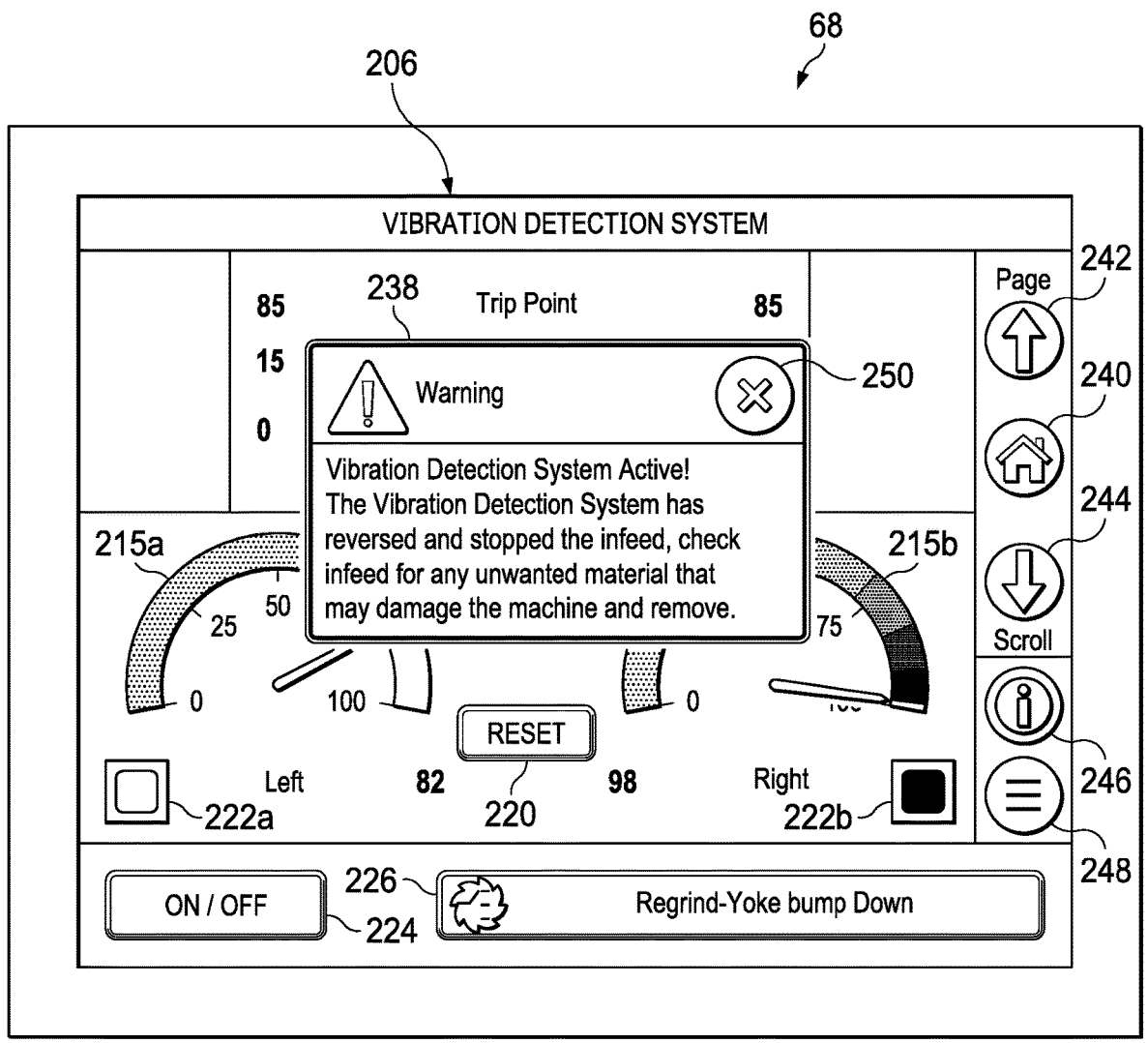
FIG. 14 is still another screen shot of the control panel of the machine of FIG. 1.

Referring to FIGS. 13 and 14, sample display screens 204 and 206 are shown illustrating a tripped condition in which the right vibration sensor 55 has generated a vibration signal of 98, which is greater than the right trip point setting of 85, so the right vibration sensor status indicator 222b is shown in an alarm state (e.g., red color, flashing light, or other suitable visual indication that is different from that of the normal, untripped state). Because the right vibration signal has exceeded the associated trip point setting, one or more alarm messages 236, 238 may be displayed on the screen to indicate the tripped status to the user and instruct the user on how to proceed. In this example, the left vibration signal is shown at a level of 82, which is below the left trip point setting of 85, so the left vibration sensor status indicator 222a is still shown in the normal state (e.g., blank, or green light, or other suitable visual indication that is different from that of the alarm state). Although the left vibration signal was not high enough to trip the system in this example, the tripped alarm condition is shown because the right vibration signal was high enough to trip the system.

Figure 15:
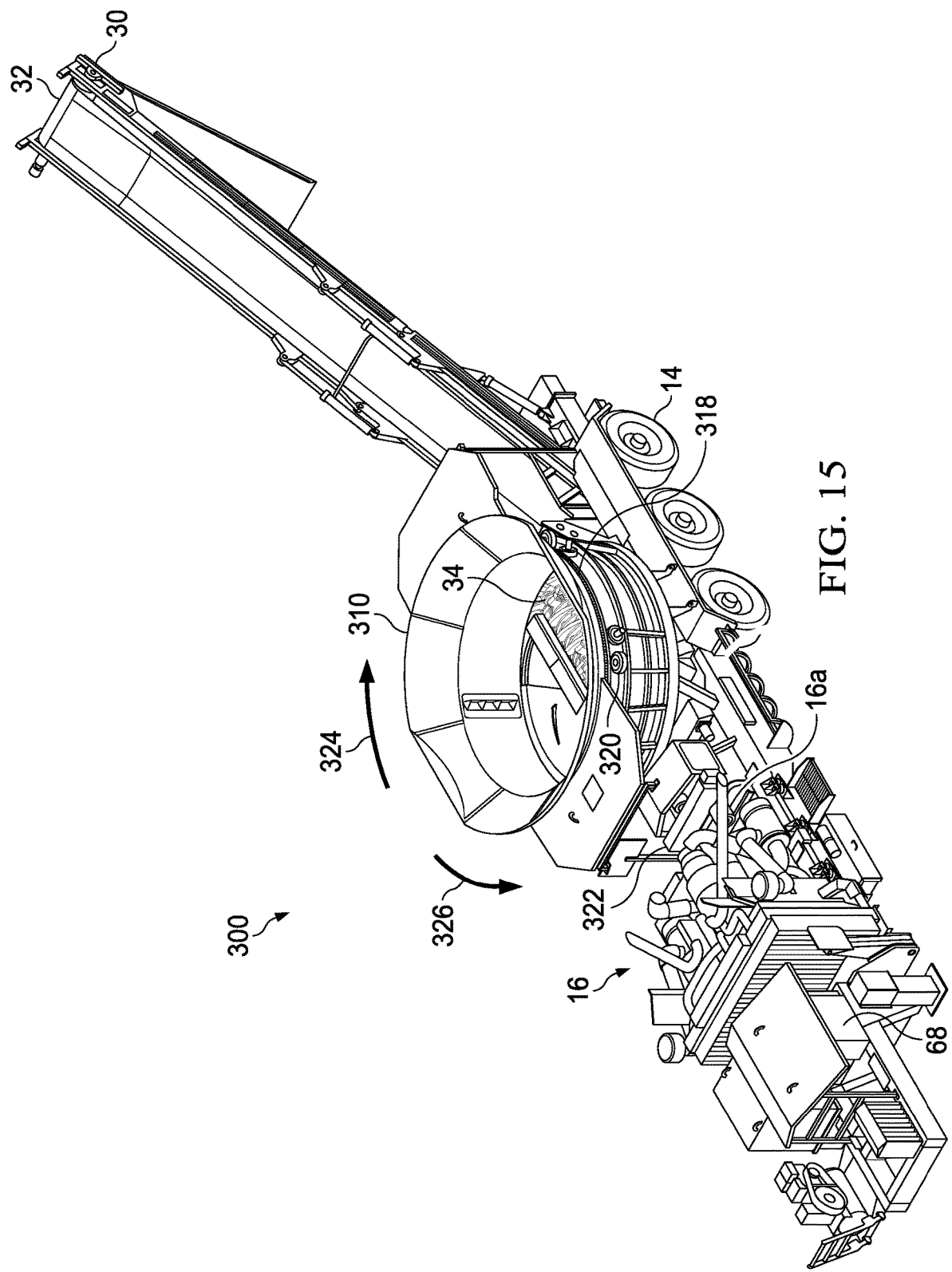
FIG. 15 is a perspective view of another embodiment of a wood grinding machine having a tub shown in a closed position.
Figure 16:
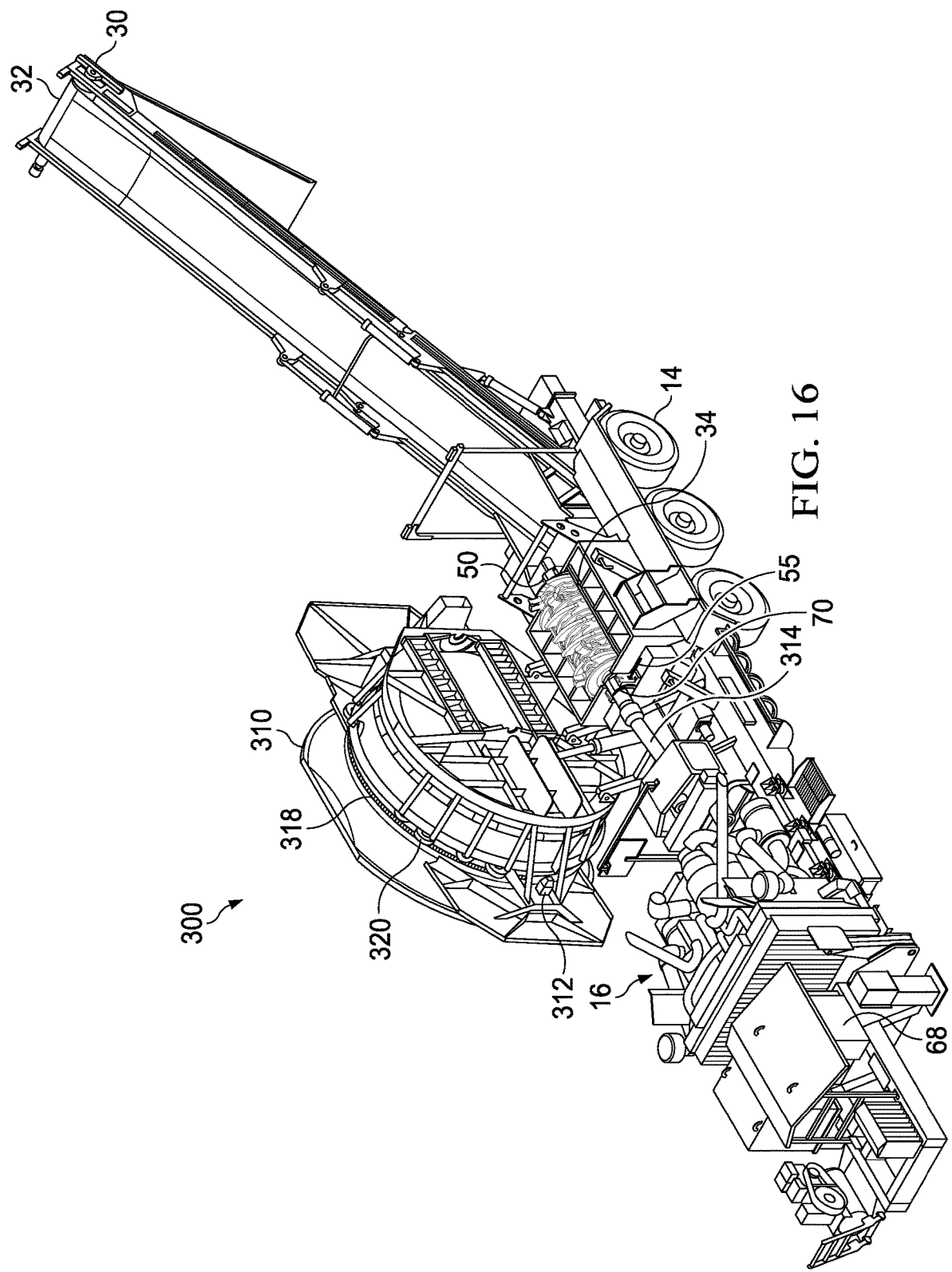
FIG. 16 is a perspective view of the wood grinding machine of FIG. 15 wherein the tub is shown in an open position.
Figure 17:
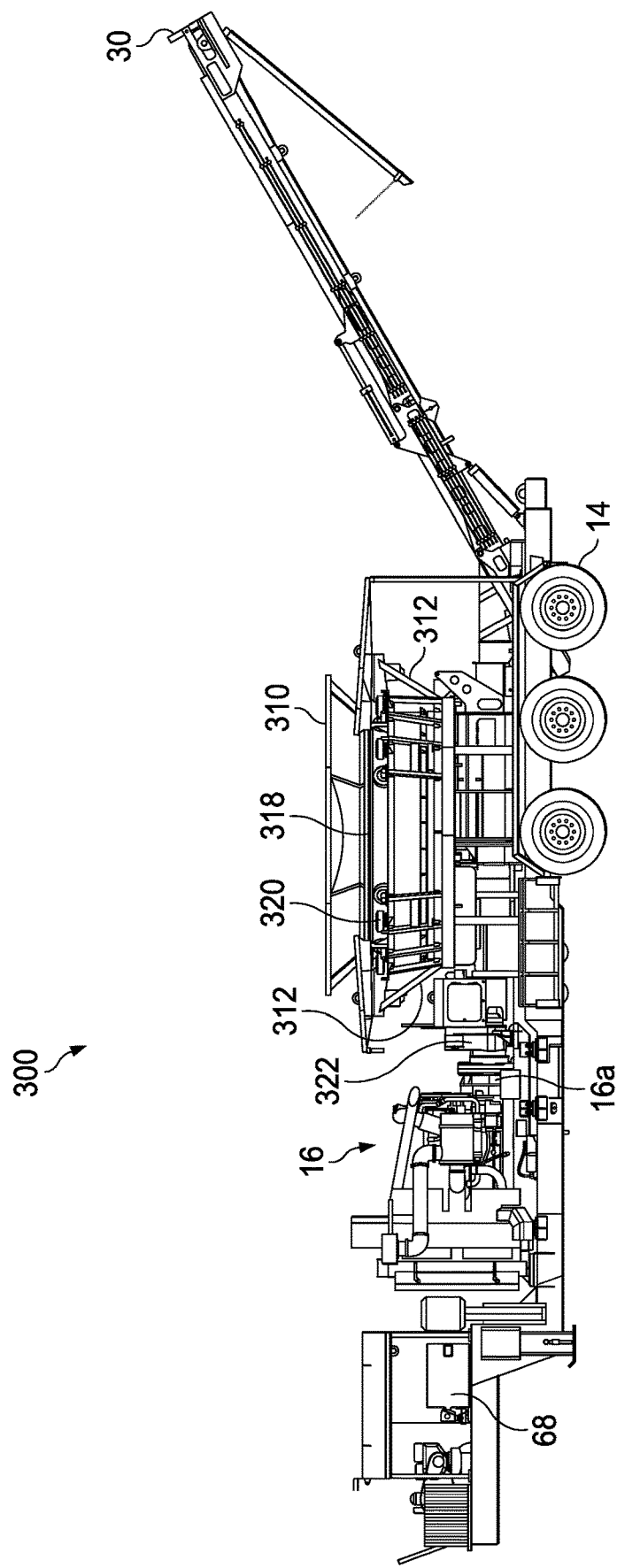
FIG. 17 is a side elevational view of the wood grinding machine of FIG. 15.
Figure 18:
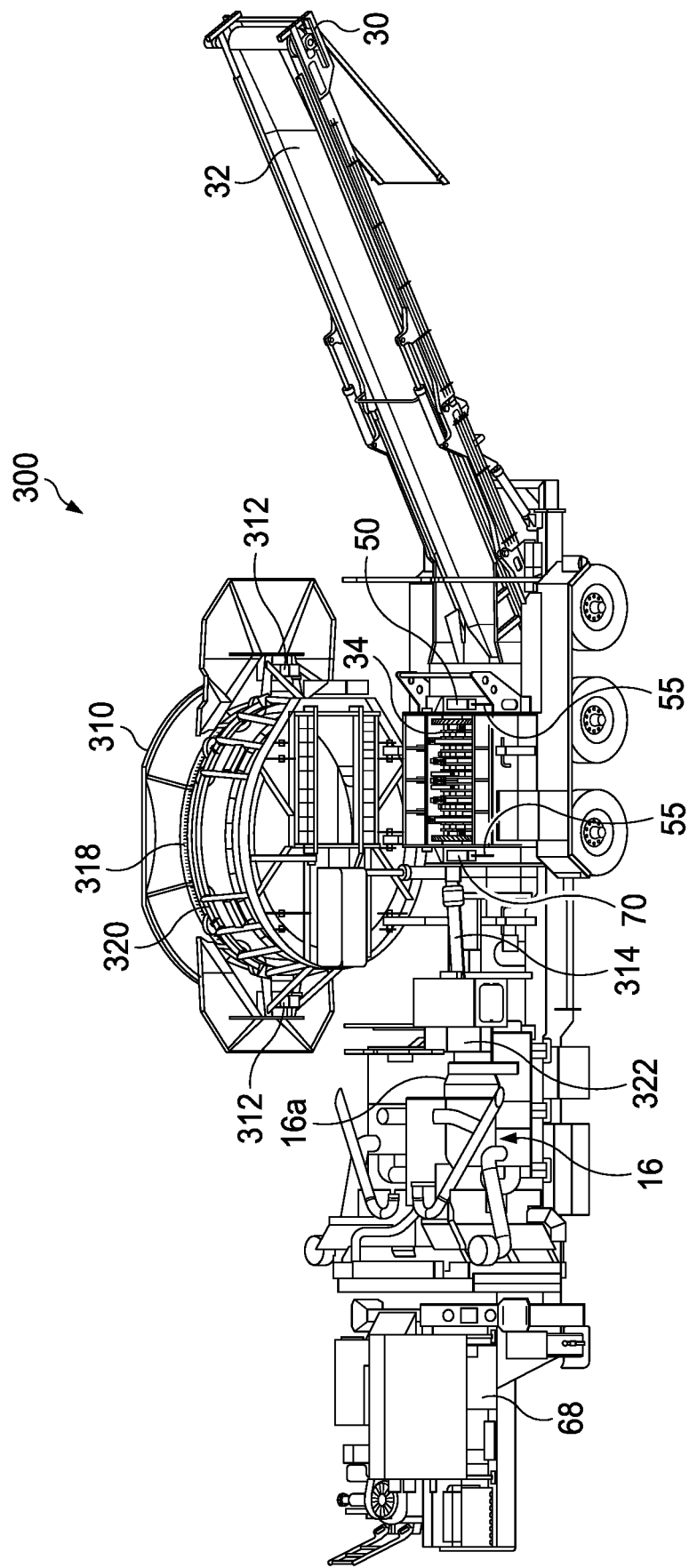
FIG. 18 is a side perspective view of the wood grinding machine of FIG. 15 wherein the tub is shown in an open position.
Figure 19:
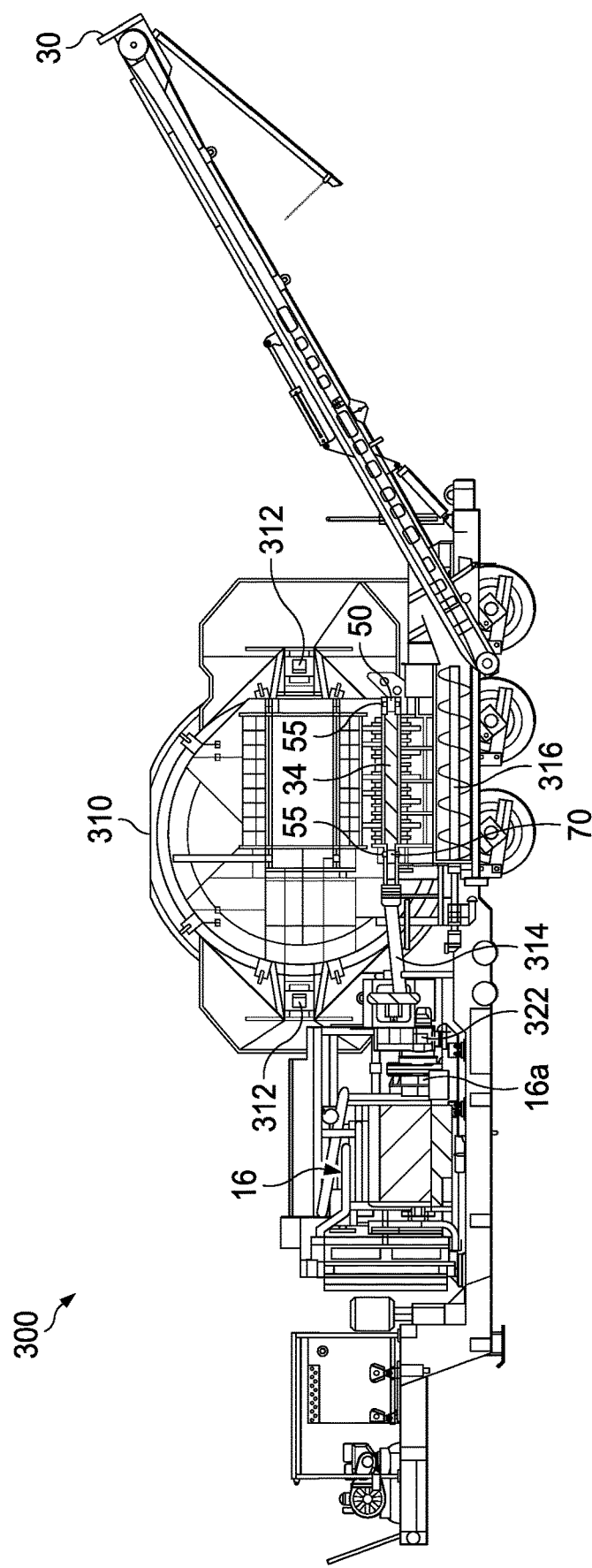
FIG. 19 is a side schematic view of the wood grinding machine of FIG. 15 wherein the tub is shown in an open position.

As shown in FIGS. 15-19, another exemplary embodiment of a wood grinding machine 300 may be configured similar to wood grinding machine 10 described above, except that instead of or in addition to an infeed bed chain 22 and feedwheel 24, wood grinding machine 300 may have a rotatably mounted tub 310 configured to receive wood material into wood grinding machine 300 for grinding by grinding rotor 34. Additionally, instead of or in addition to a first material discharge conveyor 40, wood grinding machine 300 may have one or more augers 316 configured to receive ground up wood material from grinding rotor 34 and move it onto material discharge conveyor 30. Tub 310 may include a sprocket 318 configured for cooperation with one or more drive chains, gears, sprockets, or other suitable drive elements driven by one or more tub drive motors 312 configured to rotate tub 310 in a first direction 324 and a second direction 326. One of the first and second directions 324, 326 may be a forward direction, and the other may be a reverse direction. One or more tub guides 320 may be provided to help stabilize tub 310. Tub 310 may be rotatably mounted on a frame or other suitable structure that is pivotable between a first position (e.g., an operating position) as shown in FIGS. 15 and 17 and a second position (e.g., an inspection or maintenance position) as shown in FIGS. 16, 18, and 19, or any position therebetween. Engine 16 may be operably connected to grinding rotor 34 via clutch 16a, a gearbox 322, and a driveshaft 314, for example. Similar to wood grinding machine 10, one or more vibration sensors 55 (e.g., accelerometers) may be installed on or near drive side rotor bearing 70 and idle side rotor bearing 50, for example, as part of a vibration detection system as described above for wood grinding machine 10. As wood grinding machine 300 is used to grind wood materials, the vibration detection system may function as described above for wood grinding machine 10, except that the feedworks 25 may be comprised of tub 310 rather than or in addition to infeed bed chain 22 and feedwheel 24.

Although the foregoing specific details describe certain embodiments of this invention, persons of ordinary skill in the art will recognize that various changes may be made in the details of this invention without departing from the spirit and scope of the invention as defined in the appended claims and other claims that may be drawn to this invention and considering the doctrine of equivalents. Among other things, any feature described for one embodiment may be used in any other embodiment, and any feature described herein may be used independently or in combination with other features. Also, unless the context indicates otherwise, it should be understood that when a component is described herein as being mounted or connected to another component, such mounting or connection may be direct with no intermediate components or indirect with one or more intermediate components. Therefore, it should be understood that this invention is not to be limited to the specific details shown and described herein.

What is claimed is:

1. A wood grinding machine for grinding wood material, comprising:
    an engine;
    a clutch configured for engagement and disengagement with respect to said engine;
    a grinding rotor configured for rotation about a first axis to grind the wood material;
    said grinding rotor being rotationally driven by said engine in a grinding direction of rotation when said clutch is engaged with said engine;
    a feedwheel configured for rotation about a second axis in a forward rotational direction for moving the wood material into engagement with said grinding rotor and a reverse rotational direction for moving the wood material away from said grinding rotor;
    a feedwheel motor configured for driving said feedwheel in said forward rotational direction and said reverse rotational direction;
    an infeed comprising an infeed bed chain configured for moving the wood material in a forward direction toward said feedwheel and a reverse direction away from said feedwheel;
    an infeed bed chain drive configured for driving said infeed bed chain in said forward direction and said reverse direction;
    a processor in communication with said engine, said clutch, said feedwheel motor, and said infeed bed chain drive;
    a memory comprising instructions executable by said processor;
    a control panel in communication with said processor; and
    at least one vibration sensor mounted proximate said grinding rotor and being in communication with said processor;
    said at least one vibration sensor being configured for generating a vibration signal indicative of a level of vibration of said grinding rotor and sending said vibration signal to said processor;
    wherein said instructions include instructions for:
        allowing a user to select a grinding mode from a plurality of pre-defined grinding modes, wherein each pre-defined grinding mode defines a plurality of grinding parameters including a feed speed setting representative of a rate at which material is fed to the grinding rotor and a trip point representative of a maximum allowable level of vibration, and wherein a setting of at least one of the plurality of grinding parameters is different between a first said pre-defined grinding mode and a second said pre-defined grinding mode;
        monitoring said vibration signal in relation to said trip point; and
        if said vibration signal exceeds said trip point, activating a trip protocol comprising:
        stopping and reversing said feedwheel and said infeed bed chain,
        idling said engine,
        disengaging said clutch from said engine, and
        displaying an indication of a trip condition on said control panel.

2. The wood grinding machine of claim 1 further comprising a material discharge conveyor configured for receiving ground wood material from said grinding rotor and discharging the ground wood material from the wood grinding machine.

3. The wood grinding machine of claim 1 wherein at least one of said plurality of grinding parameters comprises a pre-set value.

4. The wood grinding machine of claim 1 wherein at least one of said plurality of grinding parameters comprises a user defined value.

5. The wood grinding machine of claim 1 wherein said at least one vibration sensor comprises an accelerometer.

6. The wood grinding machine of claim 1 wherein said plurality of grinding parameters further includes:
   a coarse signal adjustment setting; and
   a fine signal adjustment setting.

7. The wood grinding machine of claim 1 wherein said pre-defined grinding modes are selectable from: trees and stumps; green waste; brush; construction and demolition; regrind; and large logs and chunks.

8. The wood grinding machine of claim 1 wherein said at least one vibration sensor comprises a first accelerometer disposed on a first bearing of said grinding rotor and a second accelerometer disposed on a second bearing of said grinding rotor.

9. The wood grinding machine of claim 8 wherein said instructions further include instructions for:
   establishing a first trip point representative of a maximum allowable level of vibration associated with said first bearing;
   establishing a second trip point representative of a maximum allowable level of vibration associated with said second bearing; and
   activating said trip protocol if a vibration signal from either said first accelerometer or said second accelerometer exceeds said first or second trip point, respectively.

10. The wood grinding machine of claim 9 wherein said first trip point and said second trip point are user defined.

11. The wood grinding machine of claim 9 wherein said instructions further include instructions for displaying a vibration reading on said control panel, wherein the vibration reading provides a visual indication of a value for each of said vibration signals from said first and second accelerometers when the values are less than the respective first and second trip points.

12. The wood grinding machine of claim 11 wherein said indication of a value for each of said vibration signals comprises a graphical gauge.

13. The wood grinding machine of claim 11 wherein said indication of a value for each of said vibration signals comprises a numerical indication.

14. The wood grinding machine of claim 1 wherein said trip protocol further comprises displaying one or more warning messages on said control panel.

15. The wood grinding machine of claim 1 wherein said forward rotational direction of said feedwheel is opposite said grinding direction of rotation of said grinding rotor.

16. The wood grinding machine of claim 1 wherein said forward rotational direction of said feedwheel is the same as said grinding direction of rotation of said grinding rotor.

17. The wood grinding machine of claim 1 wherein said feedwheel motor comprises a hydraulic motor disposed within said feedwheel.

18. The wood grinding machine of claim 1 wherein said grinding rotor comprises a hammermill including a plurality of hammers.

19. A method of operating a wood grinding machine to grind wood material, the wood grinding machine comprising an engine, a clutch engageable with and disengageable from the engine, a rotationally mounted grinding rotor configured for engagement with the wood material as the grinding rotor rotates in a grinding direction of rotation when the clutch is engaged with the engine, a feedwheel driven by a feedwheel motor and configured for forward rotation and reverse rotation, an infeed bed chain driven by an infeed bed chain drive and configured for moving the wood material in a forward direction toward the feedwheel and a reverse direction away from the feedwheel, and a vibration detection system comprising a processor in communication with the engine, the clutch, the feedwheel motor, and the infeed bed chain drive, a memory comprising instructions executable by the processor, a control panel in communication with the processor, and at least one vibration sensor in communication with the processor, the control panel comprising a display having an indication of a vibration signal generated by the at least one vibration sensor, the method comprising:
   turning on the vibration detection system;
   selecting a user-selected grinding mode from a plurality of pre-defined grinding modes, each pre-defined grinding mode comprising a plurality of grinding parameters including a feed speed setting and a trip point, wherein a setting of at least one of the plurality of grinding parameters is different between a first said pre-defined grinding mode and a second said pre-defined grinding mode;
   activating the grinding rotor, the infeed bed chain, and the feedwheel;
   feeding the wood material onto the infeed bed chain to begin a grinding process;
   monitoring the vibration signal;
   if the vibration signal exceeds the trip point, waiting for the vibration detection system to execute a trip protocol comprising
      stopping and reversing the feedwheel and the infeed bed chain,
      idling the engine,
      disengaging the clutch from the engine, and
      displaying an indication of a trip condition on the control panel;
   removing any unwanted material from the wood grinding machine;
   resetting the vibration detection system; and
   resuming the grinding process.

20. The method of claim 19 wherein said plurality of grinding parameters further comprises:
   a coarse signal adjustment setting; and
   a fine signal adjustment setting.

21. A wood grinding machine for grinding wood material, comprising:
   an engine;
   a clutch configured for engagement and disengagement with respect to said engine;
   a grinding rotor configured for rotation about a first axis to grind the wood material;
   said grinding rotor being rotationally driven by said engine in a grinding direction of rotation when said clutch is engaged with said engine;
   a tub configured for rotation about a second axis in a forward rotational direction for moving the wood material into engagement with said grinding rotor and a reverse rotational direction for moving the wood material away from said grinding rotor;
   a tub drive motor configured for driving said tub in said forward rotational direction and said reverse rotational direction;
   a processor in communication with said engine, said clutch, and said tub drive motor;
   a memory comprising instructions executable by said processor;
   a control panel in communication with said processor; and
   at least one vibration sensor mounted proximate said grinding rotor and being in communication with said processor;

said at least one vibration sensor being configured for generating a vibration signal indicative of a level of vibration of said grinding rotor and sending said vibration signal to said processor;

wherein said instructions include instructions for:
allowing a user to select a grinding mode that defines a plurality of grinding parameters including a feed setting and a trip point representative of a maximum allowable level of vibration;
monitoring said vibration signal in relation to said trip point; and
if said vibration signal exceeds said trip point, activating a trip protocol comprising:
stopping and reversing said tub,
idling said engine,
disengaging said clutch from said engine, and
displaying an indication of a trip condition on said control panel.

22. A method of operating a wood grinding machine to grind wood material, the wood grinding machine comprising an engine, a clutch engageable with and disengageable from the engine, a rotationally mounted grinding rotor configured for engagement with the wood material as the grinding rotor rotates in a grinding direction of rotation when the clutch is engaged with the engine, a tub driven by a tub drive motor and configured for forward rotation for moving the wood material in a forward direction toward the grinding rotor and reverse rotation for moving the wood material in a reverse direction away from the grinding rotor, and a vibration detection system comprising a processor in communication with the engine, the clutch, and the tub drive motor, a memory comprising instructions executable by the processor, a control panel in communication with the processor, and at least one vibration sensor in communication with the processor, the control panel comprising a display having an indication of a vibration signal generated by the at least one vibration sensor, the method comprising:
turning on the vibration detection system;
selecting a user-selected grinding mode comprising a plurality of grinding parameters including a feed setting and a trip point;
activating the grinding rotor and the tub;
feeding the wood material into the tub to begin a grinding process;
monitoring the vibration signal;
if the vibration signal exceeds the trip point, waiting for the vibration detection system to execute a trip protocol comprising
stopping and reversing the tub,
idling the engine,
disengaging the clutch from the engine, and
displaying an indication of a trip condition on the control panel;
removing any unwanted material from the wood grinding machine;
resetting the vibration detection system; and
resuming the grinding process.

23. A wood grinding machine for grinding wood material, comprising:
an engine;
a clutch configured for engagement and disengagement with respect to said engine;
a grinding rotor configured for rotation about a first axis to grind the wood material;
said grinding rotor being rotationally driven by said engine in a grinding direction of rotation when said clutch is engaged with said engine;
a feedworks configured for moving the wood material in a forward direction toward said grinding rotor and a reverse direction away from said grinding rotor;
a processor in communication with said engine, said clutch, and said feedworks;
a memory comprising instructions executable by said processor;
a control panel in communication with said processor; and
at least one vibration sensor mounted on said wood grinding machine and being in communication with said processor;
said at least one vibration sensor being configured for generating a vibration signal indicative of a level of vibration of said wood grinding machine and sending said vibration signal to said processor;

wherein said instructions include instructions for:
establishing a user-selected grinding mode that comprises a plurality of grinding parameters selected from a feed speed setting, an engine speed setting, a grinding rotor speed setting, a coarse signal adjustment setting, a fine signal adjustment setting, a feedworks backup setting, and a trip point representative of a maximum allowable level of vibration, wherein the coarse and fine signal adjustment settings control a level of signal amplification of the vibration signal used for providing a vibration reading,
monitoring said vibration signal in relation to said trip point;
displaying the vibration reading; and
if said vibration signal exceeds said trip point, activating a trip protocol comprising:
stopping and reversing said feedworks,
idling said engine,
disengaging said clutch from said engine, and
displaying an indication of a trip condition on said control panel.

24. The wood grinding machine of claim 23 wherein said trip protocol further comprises locking said grinding rotor.

25. The wood grinding machine of claim 24 wherein said locking includes electrically locking said grinding rotor.

26. The wood grinding machine of claim 24 wherein said locking includes mechanically locking said grinding rotor.

27. The wood grinding machine of claim 23 wherein said feedworks comprises:
a feedwheel configured for rotation about a second axis in a forward rotational direction for moving the wood material into engagement with said grinding rotor and a reverse rotational direction for moving the wood material away from said grinding rotor;
a feedwheel motor configured for driving said feedwheel in said forward rotational direction and said reverse rotational direction;
an infeed comprising an infeed bed chain configured for moving the wood material in a first direction toward said feedwheel and a second direction away from said feedwheel; and
an infeed bed chain drive configured for driving said infeed bed chain in said first direction and said second direction.

28. The wood grinding machine of claim 23 wherein said feedworks comprises:
a tub configured for rotation about a second axis in a forward rotational direction for moving the wood material into engagement with said grinding rotor and a reverse rotational direction for moving the wood material away from said grinding rotor; and a tub drive motor configured for driving said tub in said forward rotational direction and said reverse rotational direction.

29. The wood grinding machine of claim 23 wherein said grinding mode is selectable from a plurality of grinding modes.

30. The wood grinding machine of claim 29 wherein said plurality of grinding modes includes one or more of the following grinding modes: trees and stumps; green waste; brush; construction and demolition; regrind; large logs and chunks.

31. The wood grinding machine of claim 23 wherein said feedworks backup setting is selected from a specified time period and a range of time.

* * * * *